US009727278B2

(12) United States Patent
Blount

(10) Patent No.: US 9,727,278 B2
(45) Date of Patent: Aug. 8, 2017

(54) SYSTEM AND METHODS FOR MITIGATING WRITE EMULATION ON A DISK DEVICE USING CACHE MEMORY

(71) Applicant: NetApp, Inc., Sunnyvale, CA (US)

(72) Inventor: Joseph R. Blount, Andover, KS (US)

(73) Assignee: NetApp, Inc., Sunnyvale, CA (US)

( * ) Notice: Subject to any disclaimer, the term of this patent is extended or adjusted under 35 U.S.C. 154(b) by 340 days.

(21) Appl. No.: 13/917,253

(22) Filed: Jun. 13, 2013

(65) Prior Publication Data
US 2014/0368945 A1 Dec. 18, 2014

(51) Int. Cl.
G11B 20/12 (2006.01)
G06F 3/06 (2006.01)
G06F 12/0815 (2016.01)

(52) U.S. Cl.
CPC .......... G06F 3/0674 (2013.01); G06F 3/0607 (2013.01); G06F 3/0611 (2013.01);
(Continued)

(58) Field of Classification Search
CPC ................ G11B 20/12; G11B 20/1879; G11B 2220/2516; G11B 5/012; G11B 5/09; G11B 27/19; G11B 20/1251; G11B 27/329; G11B 20/1883; G11B 2220/20; G11B 2220/2575; G11B 27/034; G11B 20/1833; G11B 20/1816; G11B 20/1252; G11B 20/1803; G11B 27/34; G11B 27/36; G11B 7/0037; G11B 7/0045; G11B 7/005; G11B 20/1217; G11B 5/59605; G11B 5/59655; G11B 5/5547; G06F 21/80; G06F 2201/82; G06F 2212/1044; G06F 2212/283; G06F 3/0664; G06F 3/0665; G06F 3/0625; G06F 3/0626; G06F 3/0629; G06F 3/064; G06F 3/0661; G06F 3/0674; G06F 3/068; G06F 3/0689; G06F 12/0246; G06F 3/0679; G06F 12/0866; G06F 3/0656; G06F 3/0676; G06F 12/08; G06F 13/1694; G06F 2212/7201;
(Continued)

(56) References Cited

U.S. PATENT DOCUMENTS 5,592,342 A * 1/1997 Hall et al. ........................ 360/48
2004/0010655 A1 * 1/2004 Tanaka .................. G06F 3/0613
711/3

(Continued)

Primary Examiner — Dionne H Pendleton
(74) Attorney, Agent, or Firm — Haynes and Boone, LLP

(57) ABSTRACT

An emulation mitigation module is configured to mitigate emulation of legacy write requests on advanced disk devices using cached data stored in a cache memory of a storage system. A legacy write request may comprise write data blocks formatted in a legacy sector size while an advanced disk device may be formatted in an advanced sector size. The emulation mitigation module may execute a first method for modifying write requests using cached data, a second method for enforcing a minimum requested data size sent to the advanced disk device, and/or a third method for conditionally retrieving data from the advanced disk device and storing to cache. In some embodiments, the second and/or third method may be used with the first method to increase the effectiveness of the first method. The emulation mitigation module may improve performance and/or data integrity for of processing legacy write requests.

22 Claims, 16 Drawing Sheets

(52) U.S. Cl.
CPC .......... *G06F 3/0619* (2013.01); *G06F 3/0659* (2013.01); *G06F 3/0664* (2013.01); *G06F 3/0676* (2013.01); *G06F 12/0815* (2013.01); *G06F 2211/1085* (2013.01); *G06F 2212/224* (2013.01); *G06F 2212/461* (2013.01); *G11B 2220/20* (2013.01)

(58) Field of Classification Search
CPC .......... G06F 2212/7211; G06F 3/0613; G06F 3/0616; G06F 3/0659; G06F 11/079; G06F 11/1068; G06F 11/2058; G06F 11/2069; G06F 11/26; G06F 12/00; G06F 12/0802; G06F 12/0862; G06F 12/0868; G06F 12/0897; G06F 2003/0698; G06F 2211/1085; G06F 2212/2022; G06F 2212/214; G06F 2212/225; G06F 2212/264; G06F 2212/462; G06F 2212/602; G06F 2212/7203; G06F 2212/7208; G06F 3/0601; G06F 3/0607; G06F 3/0608; G06F 3/0611; G06F 3/0614; G06F 2212/224; G06F 3/0619; G06F 2212/461; G06F 12/0815; G06F 2211/1009; G06F 2212/281; Y02B 60/1225; Y02B 60/1246; G11C 11/40615; G11C 7/1072; G11C 16/349; G11C 29/765; G11C 11/5678; G11C 13/0004; G11C 14/0018; G11C 16/16; G11C 2216/18; G11C 16/06; G11C 16/26; G11C 11/56; G11C 16/00; G11C 16/28; G11C 16/3404; G11C 16/3418; G11C 29/026; G11C 29/028; G11C 29/42; G11C 29/50016; Y10S 707/99953; Y10S 707/99944; Y10S 707/99947; Y10S 707/99955; Y10S 707/99956; A45C 2011/188; G06K 19/07732; G06K 19/07743; H04L 49/90; H04L 49/9073; H04L 67/1097; H04L 67/2842; H04L 67/289; H05K 1/117; H05K 1/118; H05K 1/189; H05K 2201/091; H05K 2201/10159; H05K 2203/1527; H05K 3/284; H05K 3/4691

See application file for complete search history.

(56) References Cited

U.S. PATENT DOCUMENTS

| | | | |
|---|---|---|---|
| 2005/0036381 A1* | 2/2005 | Hassner | G06F 11/1076 365/222 |
| 2005/0132129 A1* | 6/2005 | Venkiteswaran | 711/103 |
| 2006/0224823 A1* | 10/2006 | Morley | G06F 3/0613 711/113 |
| 2007/0033355 A1* | 2/2007 | Maki et al. | 711/162 |
| 2008/0082743 A1* | 4/2008 | Hanebutte et al. | 711/113 |
| 2009/0168230 A1* | 7/2009 | Hwang | G11B 5/59655 360/77.08 |
| 2010/0070701 A1* | 3/2010 | Iyigun | G06F 11/1441 711/113 |
| 2010/0079904 A1* | 4/2010 | Sato | 360/77.08 |
| 2013/0132652 A1* | 5/2013 | Wood et al. | 711/103 |
| 2014/0055881 A1* | 2/2014 | Zaharris | 360/55 |
| 2016/0011984 A1* | 1/2016 | Speer | G06F 12/0891 711/102 |
| 2016/0110249 A1* | 4/2016 | Orme | G06F 3/0619 714/6.24 |

* cited by examiner

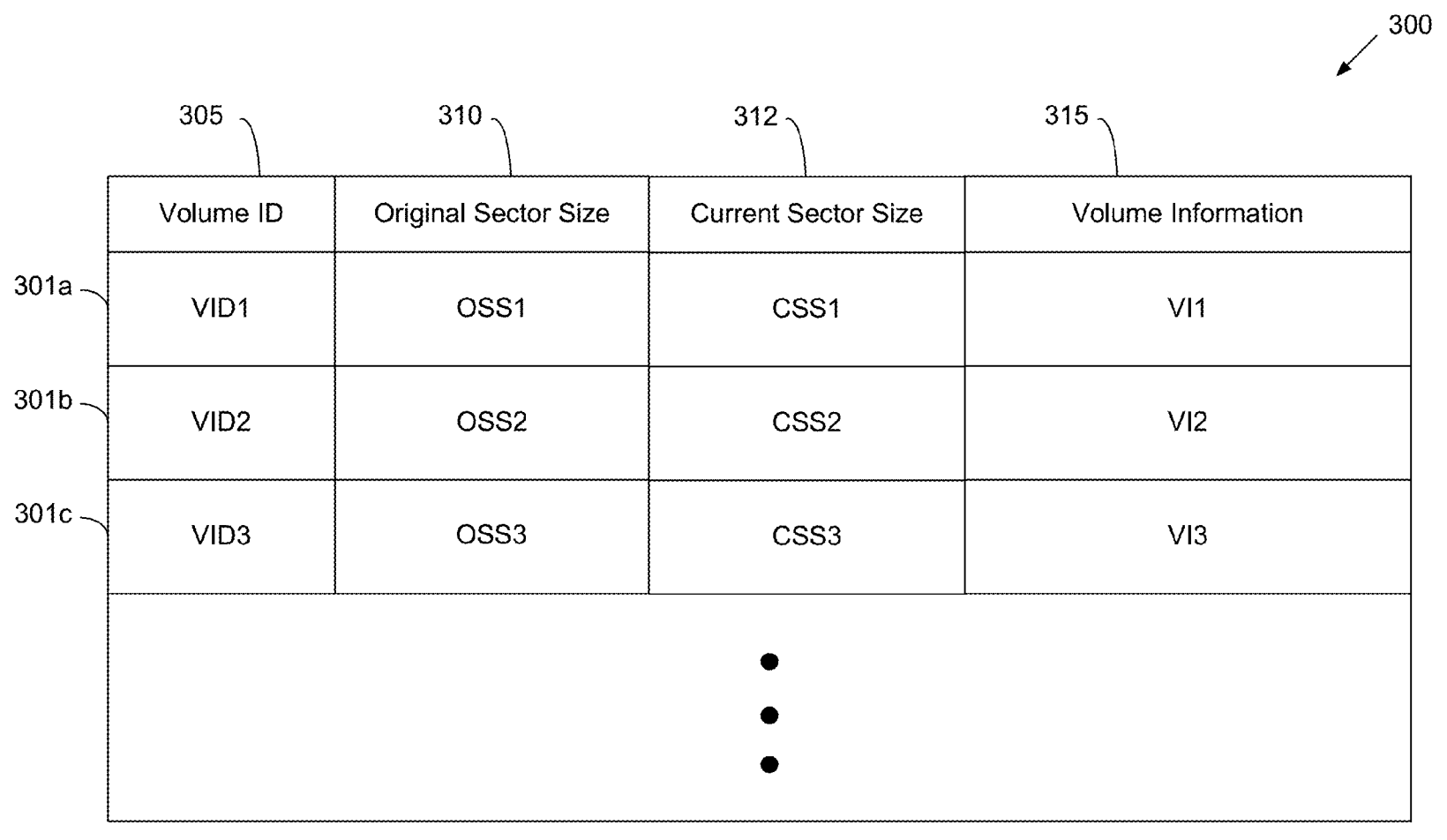

| | Volume ID | Original Sector Size | Current Sector Size | Volume Information |
|---|---|---|---|---|
| 301a | VID1 | OSS1 | CSS1 | VI1 |
| 301b | VID2 | OSS2 | CSS2 | VI2 |
| 301c | VID3 | OSS3 | CSS3 | VI3 |
| | ... | ... | ... | ... |

FIG. 3

SYSTEM AND METHODS FOR MITIGATING WRITE EMULATION ON A DISK DEVICE USING CACHE MEMORY

FIELD OF THE INVENTION

The present invention relates to storage systems, and particularly, to system and methods for mitigating write emulation on a disk device using cache memory.

BACKGROUND OF THE INVENTION

A storage system is a processing system adapted to store and retrieve information/data on storage devices (such as disks). The storage system includes a storage operating system that may implement a file system to logically organize the information as a hierarchical structure of directories and files on the storage devices. Each file may comprise a set of data blocks, whereas each directory may be implemented as a specially-formatted file in which information about other files and directories are stored.

The storage operating system generally refers to the computer-executable code operable on a storage system that manages data access and access requests (read or write requests requiring input/output operations) and may implement file system semantics in implementations involving storage systems. In this sense, the Data ONTAP® storage operating system, available from NetApp, Inc. Sunnyvale, Calif., which implements a Write Anywhere File Layout (WAFL®) file system, is an example of such a storage operating system implemented as a microkernel within an overall protocol stack and associated storage. The storage operating system can also be implemented as an application program operating over a general-purpose operating system, such as UNIX® or Windows®, or as a general-purpose operating system with configurable functionality, which is configured for storage applications as described herein.

A storage system's storage is typically implemented as one or more storage volumes that comprise physical storage devices, defining an overall logical arrangement of storage space. Available storage system implementations can serve a large number of discrete volumes. A storage volume is "loaded" in the storage system by copying the logical organization of the volume's files, data, and directories, into the storage system's memory. Once a volume has been loaded in memory, the volume may be "mounted" by one or more users, applications, devices, and the like, that are permitted to access its contents and navigate its namespace.

A storage system may be configured to allow server systems to access its contents, for example, to read or write data to the storage system. A server system may execute an application that "connects" to the storage system over a computer network, such as a shared local area network (LAN), wide area network (WAN), virtual private network (VPN) implemented over a public network such as the Internet, or Storage Area Network (SAN). The application executing on the server system may send an access request (read or write request) to the storage system for accessing particular data stored on the storage system.

The storage system may typically implement large capacity storage devices, comprising disk devices, for storing data. As known in the art, a disk device stores data on sectors, a sector comprising a minimum data size for input/output (I/O) operations (such as read/write requests) of the disk device. Each sector stores a fixed amount of user-accessible data (client data), the sector size being 512 bytes (referred to herein as a legacy sector size) for conventional disk devices (referred to as legacy disk devices). As such, a legacy disk device may store client data (e.g. data received from an application) in 512 byte addressable sectors. Currently, advanced disk devices, known as Advanced Format disk devices, store client data in sectors comprising 4,096 bytes (referred to as 4 k bytes) or more (referred to herein as advanced sector sizes). As such, an advanced disk device may store client data in at least 4,096 byte addressable sectors. The larger sector sizes of advanced disk devices have been caused by various reasons, including the increasing data sizes of the storage volumes of client data. Due to the larger amounts of client data to be stored by disk devices, the conventional minimum I/O size of 512 bytes may be inadequate and the higher minimum I/O sizes of advanced disk devices are being implemented by most disk device manufacturers, with the intention of further increasing the sector size occasionally over time.

Although advanced disk devices are increasingly being used, there still persists large numbers of legacy systems comprising legacy applications, legacy volumes, and legacy disk devices. Legacy applications may submit read/write requests based on a legacy sector size to legacy volumes comprising data formatted based on a legacy sector size, the legacy volumes being stored on legacy disk devices comprising sectors of the legacy sector size. Since legacy disk devices are being phased out by disk manufacturers, issues occur when a legacy disk devices fail and are replaced by advanced disk devices. The data of the legacy volumes previously stored on the legacy disk devices are still typically formatted based on a legacy sector size, but are stored to advanced disk devices that are based on an advanced sector size. For example, the legacy volumes may comprise data blocks formatted and addressed based on 512 byte sectors, but stored to advanced disk devices. Also, legacy applications will still assume that the legacy volume is stored to a legacy disk device and will still submit access requests (read/write requests) that are based on 512 byte sectors (e.g., specify a storage address that is based on 512 byte sectors).

As such, emulation methods have been developed and implemented on advanced disk devices to emulate legacy disk devices for legacy applications and legacy volumes. Conventionally, when an advanced disk device receives a legacy access request for a legacy volume, the advanced disk device may execute the emulation methods to perform 1) storage address conversion, and 2) emulation I/O operations. The storage address conversion may convert the received storage address that is based on 512 byte sectors (received in the access request) to a converted storage address that is based on 4 k byte sectors. The converted storage address may comprise a storage address corresponding to a start of a corresponding 4 k byte sector, and an offset position within the corresponding 4 k byte sector. The emulation I/O operations may perform various I/O operations on client data depending on whether the legacy access request is a read or write request. Note that performing the storage address conversion is a simple and straightforward procedure requiring minimal time or resources of the disk device. Performing the emulation I/O operations, however, typically requires significantly more time and resources of the disk device.

A legacy read request will typically request reading of one or more data blocks that start at a storage address, each data block being based on a 512 byte sector and comprising 512 bytes of data. The received storage address is based on 512 byte sectors and is converted to a storage address based on 4 k byte sectors that locates a corresponding 4 k byte sector and an offset position within the corresponding 4 k byte sector. For a legacy read request, the emulation I/O operations may include retrieving the corresponding 4 k byte sector from the disk device at the converted storage address. The corresponding 4 k byte sector may comprise a 4 k byte sector on the disk device that contains the requested data blocks. For example, the legacy read request may request three 512-byte data blocks that are stored within the corresponding 4 k byte sector on the disk device. As each 4 k byte sector stores eight 512-byte data blocks, the corresponding 4 k byte sector comprises the three requested 512-byte data blocks and five additional 512-byte data blocks. Since the minimum I/O size of the advanced disk device is a 4 k byte sector, the emulation method must read all eight 512-byte data blocks of the corresponding 4 k byte sector and stores them to a disk memory. From disk memory, the emulation method may then retrieve and return the three requested 512-byte data blocks at the offset position and ignore the five additional 512-byte data blocks. Emulation for legacy read requests has been shown to be a relatively efficient and data-secure process.

Emulation for legacy write requests, however, have been more problematic for advanced disk devices. Emulation of legacy write requests may become difficult since the minimum write size of the advanced disk device is a 4 k byte sector. A legacy write request will typically comprise one or more data blocks (write data blocks) to be written starting at a storage address, each write data block being based on a 512 byte sector and comprising 512 bytes. The received storage address is based on 512 byte sectors and is converted to a storage address (based on 4 k byte sectors) of a corresponding 4 k byte sector and an offset position within the corresponding 4 k byte sector.

For a legacy write request, the emulation I/O operations may include retrieving a corresponding 4 k byte sector from the disk device at the converted storage address. The corresponding 4 k byte sector may comprise a 4 k byte sector on the disk device where the write data blocks are to be written/stored. For example, the legacy write request may comprise three 512-byte data blocks that are to be stored within the corresponding 4 k byte sector on the disk device. The emulation method reads all eight 512-byte data blocks of the corresponding 4 k byte sector and stores them to a disk memory. In disk memory, the emulation method may then insert the three write data blocks at the determined offset position within the corresponding 4 k byte sector, and then write all eight 512-byte data blocks of the modified corresponding 4 k byte sector from disk memory to the disk device at the converted storage address.

Emulation for legacy write requests have typically shown performance and data integrity issues. In regards to performance, the extra steps of reading a 4 k byte sector of data, inserting 512-byte data blocks, and then rewriting the entire 4 k byte sector of data requires significant time and resources of the advanced disk device. As such, the advanced disk device will be capable of performing fewer writes in a given amount of time, reducing the overall throughput of the advanced disk device. In regards to data integrity, while the write data is being written to the disk device, interruptions (power, or otherwise) may cause the write data to be lost. Between the time the write request is received at the disk device, and the time the disk device returns a completion message (indicating that the write request is successfully completed on the disk device), the write data is considered to be indeterminate. If an interruption prevents successful completion of the write request on the disk device, the responsibility falls to the application issuing the write request, not the disk device. As such, the application must recognize the failure of the write request and reissue the write request. Write emulation also creates challenges for the disk device, since it is writing more data than requested. If an interruption occurs, the application will generally only be capable of reissuing its write data. The disk device, however, is responsible for the rest of 4 k byte sector that is to be written.

Steps are being taken to allow disk devices to maintain data integrity for interrupted writes, but this is still a new and untested area of responsibility for disk devices. Flaws in this advanced disk technology may manifest themselves as data corruptions observed by customers in the field. As such, a system and method for mitigating write emulation on a disk device is needed.

BRIEF DESCRIPTION OF THE DRAWINGS

The novel features are set forth in the appended claims. However, for purpose of explanation, several embodiments of the invention are set forth in the following figures.

FIG. 3 shows a conceptual diagram of an exemplary volume DS in accordance with some embodiments;

DETAILED DESCRIPTION

Figure 1:
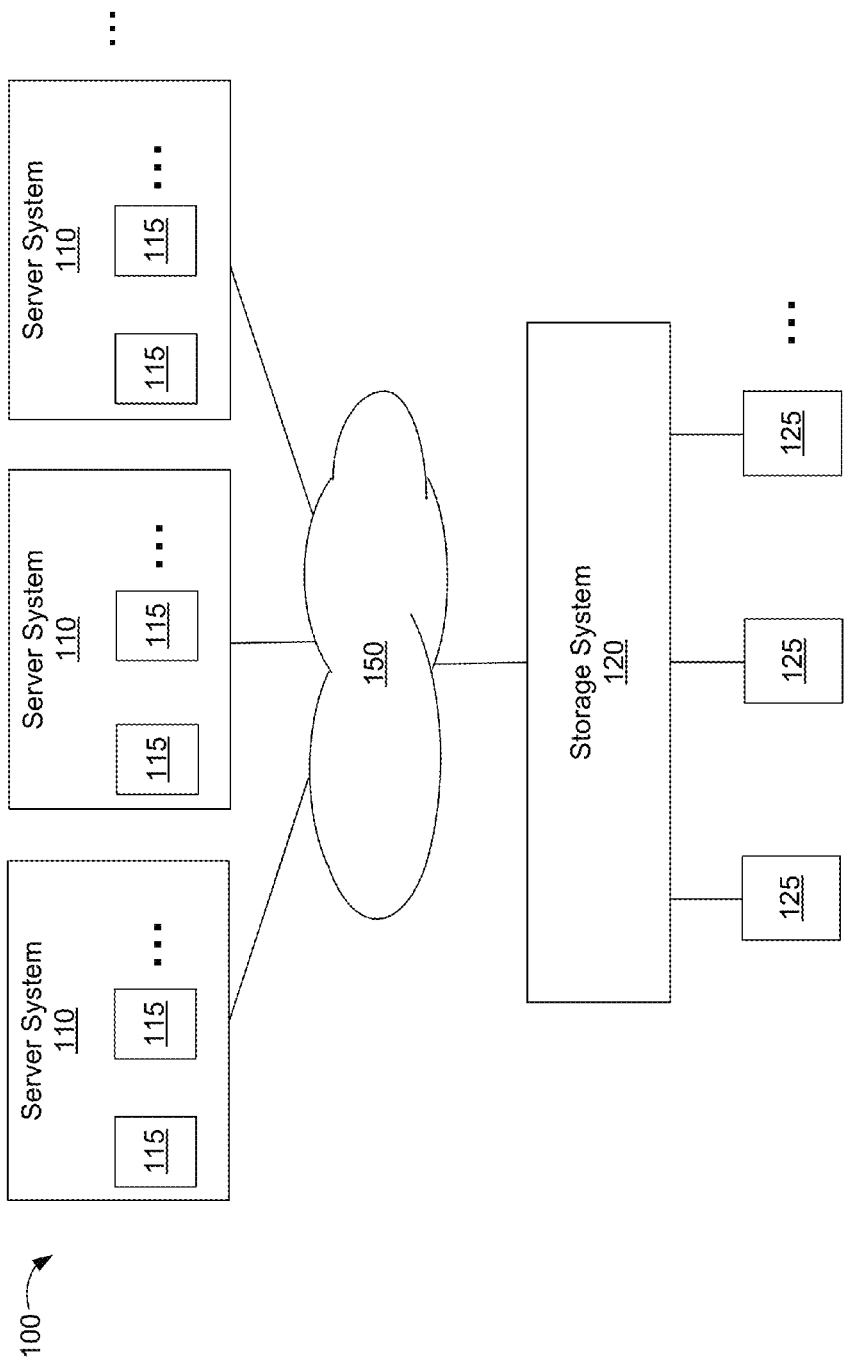
FIG. 1 is a schematic block diagram of an exemplary storage system environment in which some embodiments operate.

In the following description, numerous details are set forth for purpose of explanation. However, one of ordinary skill in the art will realize that the embodiments described herein may be practiced without the use of these specific details. In other instances, well-known structures and devices are shown in block diagram form in order not to obscure the description with unnecessary detail.

The description that follows is divided into five sections. Section I describes terms used herein. Section II describes a storage system environment in which some embodiments operate. Section III describes a first method for mitigating write emulation on a disk device by modifying write requests using cached data. Section IV describes a second method for mitigating write emulation on a disk device by enforcing a minimum read size to the disk device. Section V describes a third method for mitigating write emulation on a disk device by conditionally retrieving data from the disk device and storing to cache.

I. Terms

Sector size: As used herein, a disk device stores data on sectors having a sector size (sometimes referred to as a "native sector size"). A sector size for a disk device refers to a minimum data size for input/output (I/O) operations for the disk device. Each sector stores a fixed amount of client data comprising the sector size of the disk device. Sector sizes may comprise a legacy sector size or an advanced sector size. As used herein, the advanced sector size comprises a larger sector size than the legacy sector size. In some embodiments, the advanced sector size comprises an integer multiple of the legacy sector size. For illustrative purposes, in embodiments described below, the legacy sector size comprises 512 bytes (sometimes referred to as "512") and the advanced sector size comprises 4,096 bytes (sometimes referred to as "4 k bytes" or "4 k"). In other embodiments, however, the legacy and advanced sector sizes may comprise different data sizes. For example, the legacy sector size may comprise 4,096 bytes and the advanced sector size may comprise 8,192 bytes, and so forth. For illustrative purposes, in embodiments described below, the adjectives "512" or "legacy" are used to indicate any item or element that is based on the legacy sector size (such as a 512 or legacy application, 512 or legacy volume, 512 or legacy disk device, 512 or legacy request, 512 or legacy data block, 512 or legacy storage address, etc.) and the adjectives "4 k" or "advanced" are used to indicate any item or element that is based on the advanced sector size (such as a 4 k or advanced disk device, 4 k or advanced sector, 4 k or advanced storage address, etc.)

Storage address: As used herein, a storage address may comprise logical and/or physical address location information used by the storage system for uniquely identifying a data block on the disk devices. The storage address for a data block may be used by the storage operating system to locate and access (read/write) the data block. A storage address may be expressed in various forms. Examples of various storage addresses include inode number, file block number (FBN), logical block number (LBN), logical block address (LBA), physical block number (PBN), etc. For illustrative purposes, embodiments described herein may use a storage address comprising a logical block address (LBA). In other embodiments, another form of storage addresses may be used. Storage addresses may be formatted and based on a sector size, such as 512 bytes or 4 k bytes. Storage addresses for a set of data blocks may be continuous (sequential). A start/first data block in the set may comprise a storage address (e.g., startLBA) having a lowest value in the set, and an end/last data block in the set may comprise a storage address (e.g., endLBA) having a highest value in set.

Storage object: As used herein, a storage object comprises any logically definable storage element stored or contained within a storage system. The storage system may store a plurality of storage objects for storing data of a plurality of applications. A storage object may comprise any data container for storing data, such as an aggregate, volume, virtual volume (e.g., flexible volume), file, logical units (LUs), etc. In other embodiments, storage objects comprise any other logically definable storage element stored or contained within the storage system. For illustrative purposes, a storage object comprising a volume is used in the embodiments described herein. In other embodiments, another type of storage object other than a volume may be used in the embodiments described herein. Each storage object may be associated with a unique storage object identifier (storage object ID) that uniquely identifies the storage object within the storage system. For example, each volume may be associated with a unique volume ID that uniquely identifies the volume within the storage system.

Legacy volume: As used herein, a legacy volume comprises data blocks formatted and addressed based on a legacy sector size, each data block comprising a data size equal to the legacy sector size. For example, a legacy volume may comprise data blocks formatted based on a 512-byte sector size, each data block comprising 512 bytes. The data blocks of the legacy volume are addressed based on the legacy sector size. For example, the storage addresses of the data blocks may be based on the 512 byte sector size so that LBA=0 indicates a start address of a first 512 byte block, LBA=1 indicates a start address of a second 512 byte block, LBA=2 indicates a start address of a third 512 byte block, and so forth. As used herein, a "data block" generally refers to a data block based on a legacy sector size, and a "storage address" generally refers to a storage address based on a legacy sector size, unless mentioned otherwise.

Legacy application: As used herein, a legacy application submits legacy access requests (read/write requests) that are based on a legacy sector size for accessing data of a legacy volume. In particular, a legacy application may specify, in the legacy access request, a storage address that is based on the legacy sector size. For a write request, each write data block may be formatted based on the legacy sector size and comprise a data size equal to the legacy sector size.

II. Storage System Environment

A. Storage System Environment Overview

FIG. 1 is a schematic block diagram of an exemplary storage system environment 100 in which some embodiments operate. The environment 100 comprises one or more server systems 110 and a storage system 120 (comprising one or more storage devices 125) that are connected via a connection system 150. The connection system 150 may comprise a network, such as a Local Area Network (LAN), Wide Area Network (WAN), metropolitan area network (MAN), the Internet, Storage Area Network (SAN), or any other type of network or communication system between computer systems.

A server system 110 may comprise a computer system that utilizes services of the storage system 120 to store and manage data in the storage devices 125 of the storage system 120. A server system 110 may execute one or more applications 115 that submit read/write requests for reading/writing data on the storage devices 125 of the storage system 120. In some embodiments, the one or more applications 115 include at least one legacy application 115 that submits legacy read/write requests for reading/writing data of one or more legacy volumes.

Interaction between a server system 110 and the storage system 120 can enable the provision of storage services. That is, server system 110 may request the services of the storage system 120 (e.g., through read or write requests), and the storage system 120 may perform the requests and return the results of the services requested by the server system 110, by exchanging packets over the connection system 150. The server system 110 may submit access requests (e.g., read or write requests) by issuing packets using file-based access protocols, such as the Common Internet File System (CIFS) protocol or Network File System (NFS) protocol, over the Transmission Control Protocol/Internet Protocol (TCP/IP) when accessing data in the form of files and directories. Alternatively, the server system 110 may issue access requests by issuing packets using block-based access protocols, such as the Fibre Channel Protocol (FCP), or Internet Small Computer System Interface (iSCSI) Storage Area Network (SAN) access, when accessing data in the form of blocks.

The storage system 120 may comprise a computer system that stores data in a set of one or more storage devices 125. A storage device 125 may comprise a writable storage device media, such as disk devices, video tape, optical, DVD, magnetic tape, and any other similar media adapted to store information (including data and parity information). In some embodiments, a storage device 125 comprises an advanced disk device that is formatted based on an advanced sector size. The storage system 120 may store one or more legacy volumes to the set of one or more advanced disk devices 125, each legacy volume comprising data blocks formatted in a legacy sector size.

Each advanced disk device 125 may comprise computer hardware components (including a processor and a memory device) configured for performing read/write emulation methods to emulate a legacy disk device for legacy applications 115 that submit legacy access requests for data of legacy volumes. The emulation methods may include 1) storage address conversion, and 2) emulation I/O operations (as discussed above).

B. Storage System

Figure 2:
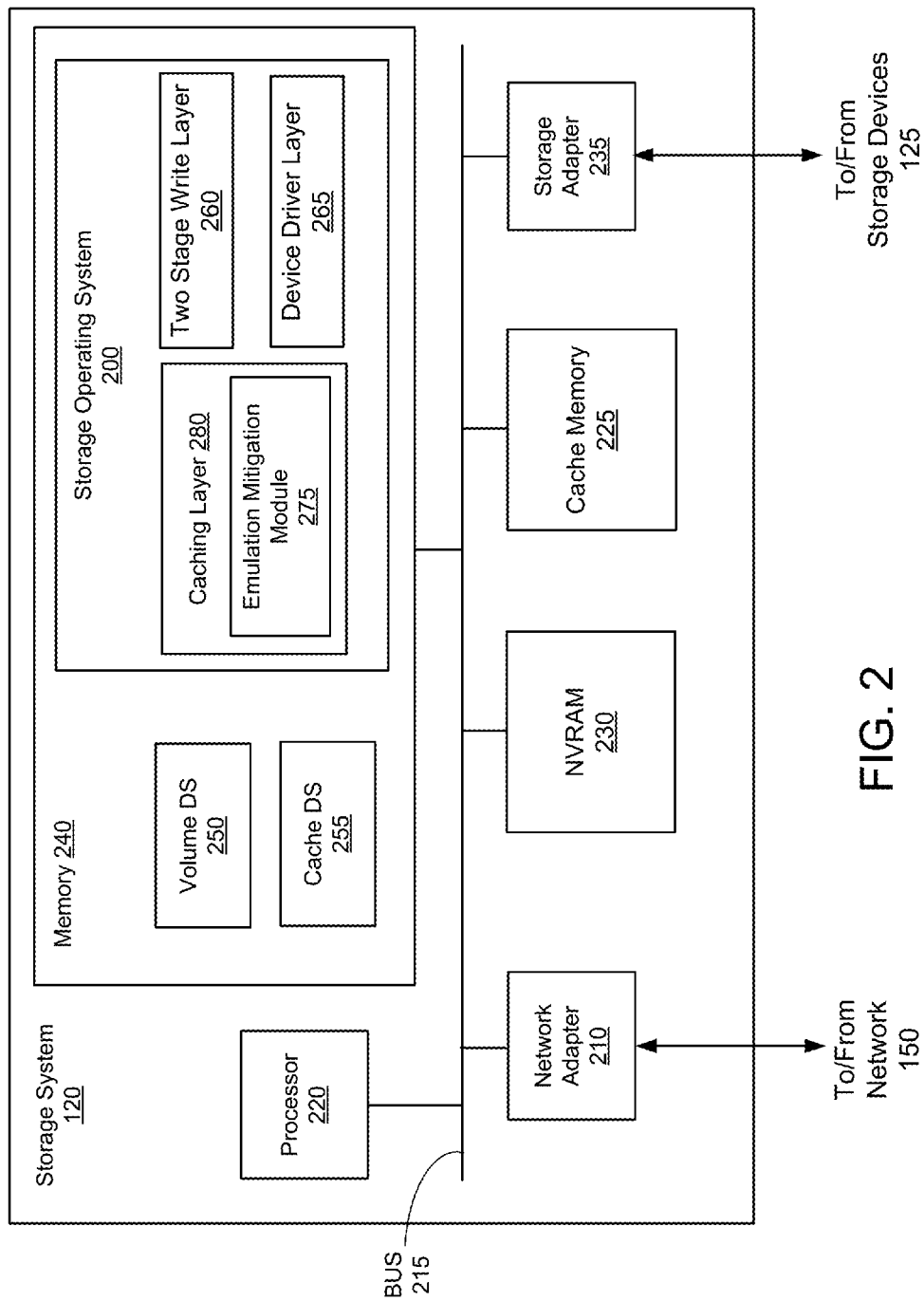
FIG. 2 is a schematic block diagram of an exemplary storage system that may be employed in the storage system environment of FIG. 1.

FIG. 2 is a schematic block diagram of an exemplary storage system 120 that may be employed in the storage system environment of FIG. 1. Those skilled in the art will understand that the embodiments described herein may apply to any type of special-purpose computer (e.g., storage system) or general-purpose computer, including a stand-alone computer, embodied or not embodied as a storage system. To that end, storage system 120 can be broadly, and alternatively, referred to as a computer system. Moreover, the teachings of the embodiments described herein can be adapted to a variety of storage system architectures including, but not limited to, a network-attached storage environment, a storage area network and disk assembly directly-attached to a server computer. The term "storage system" should, therefore, be taken broadly to include such arrangements.

The storage system 120 comprises a network adapter 210, a processor 220, a memory 240, a non-volatile random access memory (NVRAM) 230, a storage adapter 235, and a cache memory device 225 interconnected by a system bus 215. The network adapter 210 comprises the mechanical, electrical and signaling circuitry needed to connect the storage system 120 to a server system 110 over a computer network 150. The storage system may include one or more network adapters. Each network adapter 210 has a unique address (such as an IP address, World Wide Name, etc.) and may provide one or more data access ports for server systems 110 to access the storage system 120 (where the network adapter accepts read/write access requests from the server systems 110 in the form of data packets).

The memory 240 comprises storage locations that are addressable by the processor 220 and adapters for storing software program code and data. The memory 240 may comprise a form of random access memory (RAM) that is generally cleared by a power cycle or other reboot operation (e.g., it is a "volatile" memory). In other embodiments, however, the memory 240 may comprise a non-volatile form of memory that does not require power to maintain information. Some examples of memory include various form of volatile RAM (e.g., DRAM), flash memory, non-volatile random access memory (NVRAM), Magnetic Random Access Memory (MRAM), Phase Change RAM (PRAM), etc. The processor 220 and adapters may, in turn, comprise processing elements and/or logic circuitry configured to execute the software code and manipulate the data stored in the memory 240.

The storage system 120 may also include a NVRAM 230 that may be employed as a backup memory that ensures that the storage system 120 does not "lose" received information, e.g., CIFS and NFS requests, in the event of a system shutdown or other unforeseen problem. The NVRAM 230 is typically a large-volume solid-state memory array (RAM) having either a back-up battery, or other built-in last-state-retention capabilities (e.g. a FLASH memory), that holds the last state of the memory in the event of any power loss to the array. Therefore, even if an access request stored in memory 240 is lost or erased (e.g., due to a temporary power outage) it still may be recovered from the NVRAM 230.

The processor 220 executes a storage operating system application 200 of the storage system 120 that functionally organizes the storage system by, inter alia, invoking storage operations in support of a file service implemented by the storage system. In some embodiments, the storage operating system 200 comprises a plurality of software layers (including a caching layer 280) that are executed by the processor 220. Portions of the storage operating system 200 are typically resident in memory 240. It will be apparent to those skilled in the art, however, that other processing and memory means, including various computer readable media, may be used for storing and executing program instructions pertaining to the storage operating system 200.

The storage adapter 235 cooperates with the storage operating system 200 executing on the storage system 120 to access data requested by the server system 110. The data may be stored on the storage devices 125 that are attached, via the storage adapter 235, to the storage system 120 or other node of a storage system as defined herein. The storage adapter 235 includes input/output (I/O) interface circuitry that couples to the storage devices 125 over an I/O interconnect arrangement, such as a conventional high-performance, Fibre Channel serial link topology. In response to an access request received from a server system 110, data may be retrieved by the storage adapter 235 and, if necessary, processed by the processor 220 (or the adapter 235 itself) prior to being forwarded over the system bus 215 to the network adapter 210, where the data may be formatted into a packet and returned to the server system 110.

In an illustrative embodiment, the storage devices 125 may be arranged into a plurality of volumes. In some embodiments, the storage devices 125 comprise disk devices that are configured into a plurality of RAID (redundant array of independent disks) groups whereby multiple storage devices 125 are combined into a single logical unit (i.e., RAID group). In a typical RAID group, storage devices 125 of the group share or replicate data among the disks which may increase data reliability or performance. The storage devices 125 of a RAID group are configured so that some disks store striped data and at least one disk stores separate parity for the data, in accordance with a preferred RAID-4 configuration. However, other configurations (e.g. RAID-5 having distributed parity across stripes, RAID-DP, etc.) are also contemplated. A single volume typically comprises a plurality of storage devices 125 and may be embodied as a plurality of RAID groups.

The storage operating system 200 may manage and interact with the storage devices 125 using a device driver layer 265 that implements a device control protocol (such as small computer system interface (SCSI), integrated drive electronics (IDE), etc.). The storage operating system 200 may receive access requests (e.g., from an application executing on a server system 110), and in turn, submit access requests, using the device driver layer 265 to the storage devices 125 for execution of the access requests. Upon successful completion of an access request, a storage device 125 may send a message to the device driver layer 265, the message indicating that the write request is successfully completed on the storage device. The device driver layer 265 accesses the appropriate blocks from the storage devices 125 and loads the requested data in memory 240 for processing by the storage system 120. Upon successful completion of the received access request, the storage system (and storage operating system) returns a response (e.g., a conventional acknowledgement packet defined by the CIFS specification) to the server system 110 over the network 150.

The storage operating system 200 may also include a two-stage-write layer 260 for performing received write requests in two stages. In a first stage, write data blocks received in a write request are stored to cache memory 225 and a completion response is immediately sent to the application submitting the write request. After a delay period, a second stage is performed whereby the write data blocks stored in cache memory 225 are flushed/stored to the storage devices 125. The delay period may be time or storage size based. For example, the delay period may be a predetermined time period or may be based on a total allowed size for cached write data blocks, etc. In this manner, applications submitting the write request may receive a completion response quickly without waiting for the write request to be completed on the storage devices 125. Embodiments described herein may be applied to a storage system 120 that is implemented with or without a two-stage-write layer 260.

The memory 240 also stores various data structures (DSs) used for embodiments herein. In some embodiments, the memory 240 stores a volume DS 250 and a cache DS 255. In other embodiments, any or all of the various data structures (DSs) 250 and 255 may also be resident in NVRAM 230 and/or stored on a storage device 125. The volume DS 250 may store information for a plurality of volumes of the storage system 120. The cache DS 255 may store various information regarding data stored in the cache memory 225.

The storage operating system 200 maintains a volume DS 250 for storing metadata information and attributes for a plurality of volumes stored on the storage system 120. FIG. 3 shows a conceptual diagram of an exemplary volume DS 300 in accordance with some embodiments. The volume DS 300 may comprise a plurality of volume entries 301 (such as 301a, 301b, etc.), each volume entry 301 representing a volume stored in the storage system 120. Each volume entry 301 for a volume may comprise a plurality of data fields, such as data fields for a volume ID 305 (e.g., VID1, VID2, etc.), original sector size 310 (e.g., OSS1, OSS2, etc.), current sector size 312 (e.g., CSS1, CSS2, etc.), and other various volume information 315 (e.g., VI1, VI2, etc.). As discussed above, each volume may be associated with a unique volume ID 305 that uniquely identifies the volume within the storage system 120. The data field for the volume information 315 may specify various information regarding the particular volume. For example, the volume information 315 may include a data size of the volume, dates and times when the volume was created, accessed, or modified, etc.

In some embodiments, the original sector size 310 indicates the sector size that the data of volume was originally created and formatted in. The original sector size 310 will also be the sector size that a legacy application will access the volume. For example, for a legacy volume, a value of the original sector size 310 may equal 512 bytes. In some embodiments, the current sector size 312 indicates the sector size of a disk device that the data of volume is currently stored in, on the physical media. The current sector size 312 may comprise the "raw" or "native" sector size of the disk device. The current sector size 312 may comprise the minimum data size for input/output (I/O) operations inside the disk device (though the disk device may be capable of emulating a different sector size, and may accept I/Os of that emulated size). For example, for an advanced disk device, a value of the current sector size 312 may equal 4,096 bytes or larger. In some embodiments, the volume DS 300 may be used by an emulation mitigation module 275 to determine whether to perform embodiments described herein. In these embodiments, the emulation mitigation module 275 may compare the values of the original sector size 310 and the current sector size 312 to determine whether to perform embodiments described herein. For example, if the current sector size 312 is greater than the original sector size 310, the emulation mitigation module 275 may determine to perform embodiments described herein. If the current sector size 312 is equal to the original sector size 310, the emulation mitigation module 275 may determine not to perform embodiments described herein.

C. Cache Memory Device

In some embodiments, the storage system 120 also includes a cache memory device 225 for storing cached data. The cache memory device 225 may comprise a non-volatile memory device, such as a large-volume solid-state memory array (RAM) having either a back-up battery, or other built-in last-state-retention capabilities (e.g. a FLASH memory), that holds the last state of the cache memory in the event of any power loss. The caching layer 280 may cache data to provide improved response to received read or write requests. The cache memory may comprise a memory device having lower random read-latency than a typical storage device and may thus still provide faster data access than a typical large capacity storage device.

The caching layer 280 may manage data stored in the cache memory 225 using the cache DS 255. As known in the art, the cache DS 255 may store various metadata/information describing data blocks stored in the cache memory 225. In some embodiments, for each data block stored in the cache memory 225, the cache DS 255 stored an associated volume identifier, an associated storage address, a valid/invalid indicator, and a flush indicator. The volume identifier may uniquely identify the volume within the storage system that the data block is stored or is to be stored. The associated storage address (e.g., LBA) may uniquely identify the address location within the identified volume that the data block is stored or is to be stored. As such, the associated volume identifier and the associated storage address may be used to identify a storage address location for the data block. The associated volume identifier and the associated storage address may be received in an access request (read/write request) and stored to the cache DS 255.

The valid indicator indicates whether the data block comprises valid data (i.e., indicates whether the location in cache memory 225 where the data block is stored comprises valid data). If the valid indicator indicates that the data block comprises valid data, this indicates that the data block comprises client data, for example, as received from an application. Otherwise it may be assumed that the location in cache memory 225 where the data block is stored does not store client data (i.e., comprises invalid data such as null values). The flush indicator may be used for storage systems implementing a two stage write, wherein during a first stage received write data blocks are stored to the cache memory 225, and during a second stage the write data blocks accumulated in the cache memory 225 are "flushed" to disk (sent and written to disk). The flush indicator may be used to indicate whether a particular data block is a cached write data block that needs to be sent and written to disk during the second stage. As such, whenever new data blocks are stored to the cache memory 225, the caching layer 280 may set the valid and flush indicators accordingly for each new data block.

The caching layer 280 may execute conventional read caching algorithms that pre-fetch data from the disk devices 125 and store the retrieved data to the cache memory 225. The data to be pre-fetched from the disk devices 125 is typically selected based on patterns of received read requests. Reads and writes often follow a pattern called "locality of reference" which is a tendency for reads and writes to occur in groups of somewhat adjacent storage addresses. For example, if a read or write occurs at a given storage address, there is an increased likelihood reads or writes in the near future will occur in nearby storage addresses. This is a basic premise behind caching where data is held (or retrieved) based on the prediction that it is likely to be needed in the future. Conventionally, pre-fetching of data is based on the assumption of locality of reference for adjacent read requests. In some embodiments, the caching layer 280 is configured to execute write caching algorithms that pre-fetch data from the disk devices 125 based on patterns of received write requests.

The caching layer 280 may include an emulation mitigation module 275 configured to perform embodiments described herein. The emulation mitigation module 275 operates in conjunction with the other software layers of the storage operating system 200 to perform embodiments described herein. In some embodiments, the emulation mitigation module 275 may comprise an engine comprising computer software and/or hardware configured to perform embodiments described herein. In general, functions of a software module or software layer described herein may be embodied directly in computer hardware, or embodied as software executed by a processor, or embodied as a combination of the two.

In some embodiments, the emulation mitigation module 275 is configured to mitigate write request emulation on advanced disk devices using the cache memory 225. In some embodiments, the emulation mitigation module 275 may execute a method for modifying write requests using cached data, a method for enforcing a minimum read size to the disk device, and/or a method for conditionally retrieving data from the disk device and storing to cache.

D. Disk Sectors and Alignment

Figure 4:
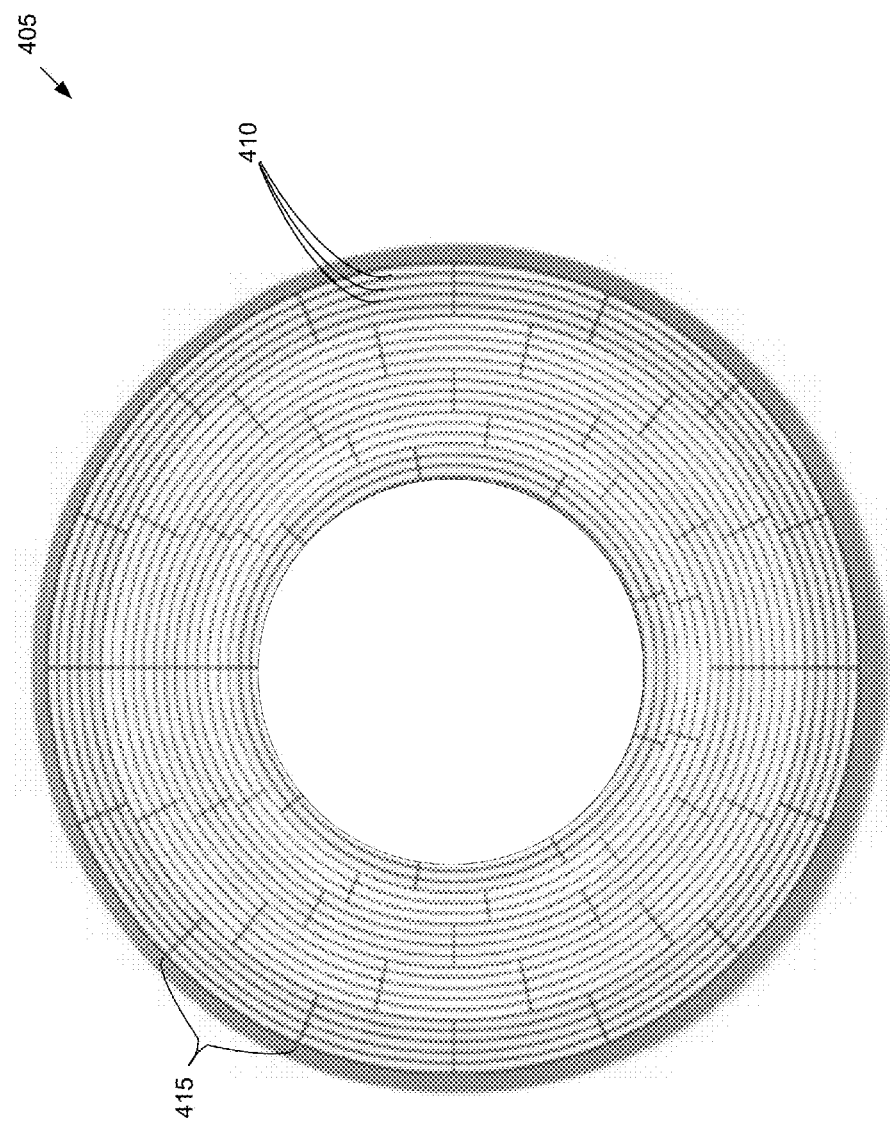
FIG. 4 shows a conceptual representation of a disk platter comprising a plurality of sectors.

As known in the art, a disk device comprises a plurality of stacked platters, each platter having a read/write head that retrieves and writes data to the platter. FIG. 4 shows a conceptual representation of a disk platter 405 that comprises a plurality of tracks 410 (shown as concentric circles), each track being divided into a plurality of sectors 415 (shown as segments of the concentric circles). The disk device stores data on the sectors, a sector comprising a minimum data size for input/output (I/O) operations (such as read/write requests) of the disk device. Each sector stores a fixed amount of user-accessible data (client data).

Currently, advanced disk devices, known as Advanced Format disk devices, store client data in sectors comprising 4,096 bytes (referred to as 4 k bytes) or more (referred to herein as advanced sector sizes). As such, an advanced disk device may store client data in at least 4,096 byte sectors. The sectors are addressed based on an advanced sector size. For example, the storage addresses of the data blocks may be based on the 4 k byte sector size so that LBA=0 indicates a start address of a first 4 k bytes, LBA=1 indicates a start address of a second 4 k bytes, LBA=2 indicates a start address of a third 4 k bytes, and so forth.

Figure 5:
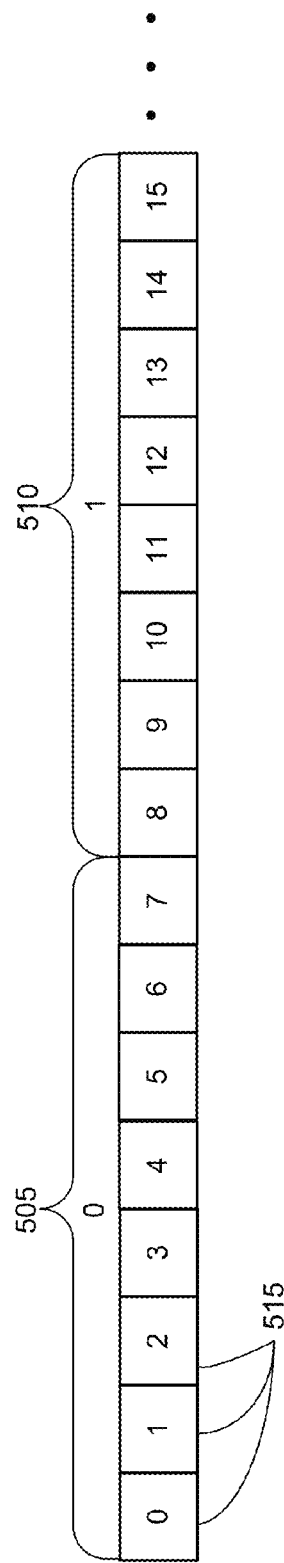
FIG. 5 shows an exemplary conceptual diagram of two adjacent 4 k sectors.

FIG. 5 shows an exemplary conceptual diagram of two adjacent 4 k sectors 505 and 510, each 4 k sector storing eight 512-byte data blocks 515. Each 4 k sector may be addressed based on the 4 k sector size. For example, based on a 4 k sector size, a first 4 k sector 505 may be addressed as LBA=0 and a second 4 k sector 510 may be addressed as LBA=1. Each 4 k sector may store eight 512-byte data blocks 510. An advanced disk device may be physically formatted in 4 k sectors and yet store 512 data blocks for legacy volumes. In these embodiments, the 4 k sector may be referred to as a "native sector" of the advanced disk device and the 512 data block as an "emulated sector" of the advanced disk device (what the disk device is pretending/emulating to be formatted in).

The first 4 k sector 505 may store eight 512-byte data blocks 515 that may be addressed based on a 512 sector size. For example, in the first 4 k sector 505, a first 512 data block 515 may be addressed as LBA=0, a second 512 data block 515 may be addressed as LBA=1, and so forth, to an eighth 512 data block 515 addressed as LBA=7. Likewise, the second 4 k sector 510 may store eight 512-byte data blocks 510 addressed based on a 512 sector size. For example, in the second 4 k sector 510, a first 512 data block 515 may be addressed as LBA=8, a second 512 data block 515 may be addressed as LBA=9, and so forth, to an eighth 512 data block 515 addressed as LBA=15.

Note that the first 4 k sector 505 comprises a "corresponding sector" for the 512 data blocks spanning from LBA 0 through LBA 7, and the second 4 k sector 510 comprises a "corresponding sector" for the 512 data blocks spanning from LBA 8 through LBA 15. As used herein, for a 512 data block (with an associated 512 LBA), its corresponding 4 k sector (with an associated 4 k LBA) is the 4 k sector on the disk device that contains/stores or will contain/store the 512 data block. A set of one or more 512 data blocks may have one or multiple corresponding 4 k sectors if the set of 512 data blocks are contained within and span across multiple corresponding 4 k sectors. The corresponding 4 k sector for a 512 data block may be determined by converting its 512 LBA to a 4 k LBA which identifies the corresponding 4 k sector. Any storage address conversion method known in the art may be used, such as divide 512 LBA by 8, then round down to next integer.

All eight 512 data blocks contained within a corresponding 4 k sector may be referred to herein as a "corresponding set of data blocks" having a "corresponding set of storage addresses." The corresponding sets of data blocks may comprise one or more "corresponding data blocks" and one or more "additional data blocks." Each corresponding data block has a "corresponding storage address" and each additional data block has an "additional storage address." As used herein, a corresponding data block may correspond to a data block requested or specified in a read or write request, and the additional data blocks may comprise all other data blocks in the corresponding set of data blocks that are not corresponding data blocks. As such, for a data block specified in a read or write request, a corresponding data block will have the same storage address (e.g., the same 512 LBA) and the same offset position within the corresponding sector. In contrast, an additional data block will not have the same storage address or the same offset position within the corresponding sector as any of the data blocks specified in the read or write request.

For example, a read request may request the 512 data blocks having LBAs 8-11. As such, the second 4 k sector 510 is the corresponding sector, the corresponding set of data blocks are data blocks having LBAs 8-15, the corresponding data blocks comprises data blocks having LBAs 8-11, and the additional data blocks comprises data blocks having LBAs 12-15 (the remaining data blocks of the corresponding sector). Likewise, for a write request that is requesting four 512 write data blocks to be written to LBAs 8-11, the result will be similar (the corresponding data blocks comprises data blocks having LBAs 8-11 and the additional data blocks comprises data blocks having LBAs 12-15).

A set of 512 one or more data blocks may be aligned or not aligned to boundaries of its corresponding 4 k sector. A set of 512 data blocks that are aligned to boundaries of its corresponding 4 k sector will meet these two requirements: 1) the set of 512 data blocks will collectively comprise the same data size as its corresponding 4 k sector and 2) the set of 512 data blocks will be located and span from the start of the corresponding 4 k sector through the end of the corresponding 4 k sector. For example, the set of 512 data blocks spanning from LBA 8 through LBA 15 are aligned with the boundaries of the second 4 k sector 510 since collectively the set of 512 data blocks comprises the same data size (4,096 bytes) as the second 4 k sector 510 and are located from the start through the end of the second 4 k sector 510. A set of 512 data blocks are not aligned to boundaries of its corresponding 4 k sector if it does not meet these two requirements. For example, the set of 512 data blocks spanning from LBA 8 through LBA 12 are not aligned with the second 4 k sector 510 they meet neither requirement. As a further example, the set of 512 data blocks spanning from LBA 7 through LBA 14 are not aligned with either 4 k sectors. Although this set of 512 data blocks collectively comprises the same data size (4,096 bytes) as a 4 k sector, they are located from the start through the end of either 4 k sector.

As discussed above, all data blocks contained within one or more corresponding 4 k sectors comprise a corresponding set of data blocks having a corresponding set of storage addresses. The corresponding set of storage addresses are aligned to boundaries of the one or more corresponding 4 k sectors in that the starting/first storage address in the corresponding set of storage addresses corresponds to a start of the one or more corresponding 4 k sectors and the ending/last storage address in the corresponding set of storage addresses corresponds to an end of the one or more corresponding 4 k sectors. As such, the corresponding set of storage addresses correspond to and span from the start through the end of the one or more corresponding 4 k sectors.

III. Mitigating Write Emulation by Modifying Write Requests Using Cached Data

A. Emulation Mitigation Module Overview

In some embodiments, the emulation mitigation module 275 is configured to mitigate emulation of legacy write requests on advanced disk devices using cached data stored in the cache memory 225. The emulation mitigation module 275 may do so by reducing the complexity and difficulty of performing the emulation I/O operations of write request emulation on advanced disk devices. As such, the emulation mitigation module 275 leverages the greater resources of the storage system, such as the processor and cache memory 225, to perform methods to reduce the burden of write request emulation on advanced disk devices.

The emulation mitigation module 275 may thus improve the overall performance of processing legacy write requests as well as improve data integrity. Since the storage system typically uses hardware resources having higher performance and capabilities than disk devices, the processing time for legacy write requests may be reduced overall. In some embodiments, the emulation mitigation module 275 will store write data blocks in a non-volatile cache memory 225 that will retain the write data blocks through any possible interruptions, until the disk device reports a completion for the write request.

In some embodiments, the emulation mitigation module 275 may execute a first method for modifying write requests using cached data, a second method for enforcing a minimum requested data size sent to the disk device, and/or a third method for conditionally retrieving data from the disk device and storing to cache. In addition, the caching layer 280 may independently and simultaneously execute read caching algorithms that prefetch cache data to the cache memory 225 based on patterns of received read requests. In some embodiments, the caching layer 280 may independently and simultaneously execute write caching algorithms that prefetch cache data to the cache memory 225 based on patterns of received write requests.

In some embodiments, the first method may be implemented on the storage system by itself. In other embodiments, the first method may be used in conjunction with the second method, wherein the first and second methods may be performed separately/independently and in parallel (simultaneously). In further embodiments, the first method may be used in conjunction with the third method, wherein the first and third methods may be performed separately/independently and in parallel. In additional embodiments, the first method may be used in conjunction with the second and third methods, wherein the first, second, and third methods may be performed separately/independently and in parallel. In these embodiments, the second method and/or third method may be used along with the first method to increase the effectiveness of the first method.

In general, the first method for modifying write requests using cached data comprises receiving a write request from a legacy application comprising at least one write data block formatted in a legacy sector size. The first method then determines at least one corresponding 4 k sector that corresponds to the at least one write data block, the corresponding 4 k sector comprising a corresponding set of data blocks. Often, the cache memory 225 will already store/contain the corresponding set of data blocks. If so, the first method may produce a modified corresponding set of data blocks by inserting the at least one write data block into its corresponding offset position within the corresponding set of data blocks. The first method may then produce a modified write request comprising the modified corresponding set of data blocks and send the modified write request to the advanced disk device for completion. As such, the first method may, when there is sufficient data already stored in cache memory 225, expand received write data blocks to a set of write data blocks that are equal in data size to one or more 4 k sectors and are also aligned with the 4 k sectors.

In this manner, the burden of the advanced disk device may be mitigated since the advanced disk device need only directly store the modified corresponding set of data blocks to their one or more corresponding 4 k sectors. In particular, the advanced disk device does not need to retrieve the corresponding 4 k sectors from the disk device and stores to disk memory, insert the write data blocks at determined offset positions within the corresponding 4 k byte sectors, and then write all data blocks from disk memory to the disk device. Since the modified corresponding set of data blocks will be equal in data size to one or more 4 k sectors and will also be aligned with the 4 k sectors, the writing of the modified corresponding set of data blocks to their one or more corresponding 4 k sectors will be straightforward and require minimal processing by the advanced disk device.

In particular, in some embodiments, the first method comprises receiving a write request comprising write data for storing to a disk device. The write data is formatted in a legacy sector size (e.g., 512 bytes) and comprises at least one write data block comprising the legacy sector size. The disk device comprises a plurality of sectors formatted in an advanced sector size (e.g., 4,096 bytes), the advanced sector size being larger than the legacy sector size, each sector storing a plurality of data blocks comprising the legacy sector size. The advanced sector size may be an integer multiple of the legacy sector size. The first method determines at least one corresponding sector on the disk device, the at least one write data block to be stored to the at least one corresponding sector on the disk device, determines that the cache memory device 225 stores a corresponding set of data blocks corresponding to the at least one corresponding sector, the corresponding set of data blocks being stored to the at least one corresponding sector on the disk device. The corresponding set of data blocks comprises at least one corresponding data block and at least one additional data block, each corresponding data block corresponding to a write data block. The first method then replaces each corresponding data block with a corresponding write data block in the corresponding set of data blocks to produce a modified corresponding set of data blocks comprising at least one write data block and at least one additional data block, and then sends a modified write request to the disk device, the modified write request comprising the modified corresponding set of data blocks.

In some embodiments, the corresponding set of data blocks are aligned to boundaries of the at least one corresponding sector, wherein the corresponding set of data blocks are stored from a start of the at least one corresponding sector through an end of the at least one corresponding sector. A corresponding data block, corresponding to a write data block, has a same storage address as the write data block and an additional data block does not have a same storage address as a write data block. A corresponding data block, corresponding to a write data block, has a same offset position in a corresponding sector as the write data block and an additional data block does not has a same offset position in a corresponding sector as a write data block.

In addition, the first method may retain the modified corresponding set of data blocks in the cache device until a message is received from the disk device, the message indicating that the modified write request is successfully completed on the disk device. The first method may also not send the received write request to the disk device, and only sends the modified write request to the disk device.

In other embodiments, the first method for modifying write requests using cached data comprises receiving a write request comprising write data for storing to a disk device, the write data formatted in a legacy sector size and comprising at least one write data block comprising the legacy sector size, each write data block comprising a storage address formatted in the legacy sector size, the disk device comprising a plurality of sectors formatted in an advanced sector size. The first method then determines at least one corresponding sector on the disk device, the at least one write data block to be stored to the at least one corresponding sector on the disk device, determines a corresponding set of storage addresses, formatted in the legacy sector size, corresponding to the at least one corresponding sector, the corresponding set of storage addresses comprising at least one corresponding storage address and at least one additional storage address, each corresponding storage address being equal to a storage address of a write data block. The first method then determines that the cache device stores at least one additional data block comprising an additional storage address and sends a modified write request to the disk device, the modified write request comprising the at least one write data block and the at least one additional data block.

In addition, the corresponding set of storage addresses may be aligned to boundaries of the at least one corresponding sector, whereby the corresponding set of storage addresses correspond to a start of the at least one corresponding sector through an end of the at least one corresponding sector. The modified write request further comprises a start storage address for the corresponding set of storage addresses, the start storage address formatted in the legacy sector size, and the disk device converts the start storage address formatted in the legacy sector size to a start storage address formatted in the advanced sector size for identifying a sector for storing the at least one write data block and the at least one additional data block.

In general, the second method comprises enforcing a minimum requested data size for any read request sent to the disk device, the minimum requested data size comprising the advanced sector size. The read request may also be aligned to the advanced sector size. In some embodiments, the second method may be used along with the first method to increase the effectiveness of the first method. In these embodiments, the received read request comprises a legacy request for the data of one or more data blocks formatted based on a legacy sector size that are stored on an advanced disk device formatted based on an advanced sector size. The second method expands and aligns the legacy read requests to an advanced sector size before sending the read request to the advanced disk device. As known in the art, any data read from disk are typically stored to cache memory 225. As such, the second method causes sets of read data blocks having the advanced sector size and being aligned to the advanced sector size to be stored to cache memory in response to legacy read requests. This, in turn, increases the likelihood that the first method will execute successfully.

In general, the third method for conditionally retrieving data from the disk device and storing to cache comprises processing cached write data blocks before they are sent/flushed to disk. The third method may be used for storage systems implementing a two stage write, wherein during a first stage received write data blocks are stored to the cache memory 225, and during a second stage the write data blocks accumulated in the cache memory 225 are "flushed" to disk (sent and written to disk). The third method may process cached write data blocks during a delay period between the first and second stages.

In particular, in some embodiments, the third method may expand and align some sets of write data blocks to a 4 k sector. The third method may by continually monitoring the cache memory 225 for continuous sets of data blocks containing valid data needing to be flushed to disk (e.g., using the cache DS 255). If a continuous set of data blocks is not aligned to a 4 k sector, the third method may retrieve additional data blocks from the disk device and store them to cache memory 225. The additional data blocks may comprise data blocks adjacent to the continuous set of data blocks used to expand and align the continuous set of data blocks to a 4 k sector. As such, the third method may be used along with the first method to increase the effectiveness of the first method and the likelihood that the first method will execute successfully. In some cases, the third method may ensure that the first method will execute successfully.

B. Method for Modifying Write Requests Using Cached Data

Figure 6A:
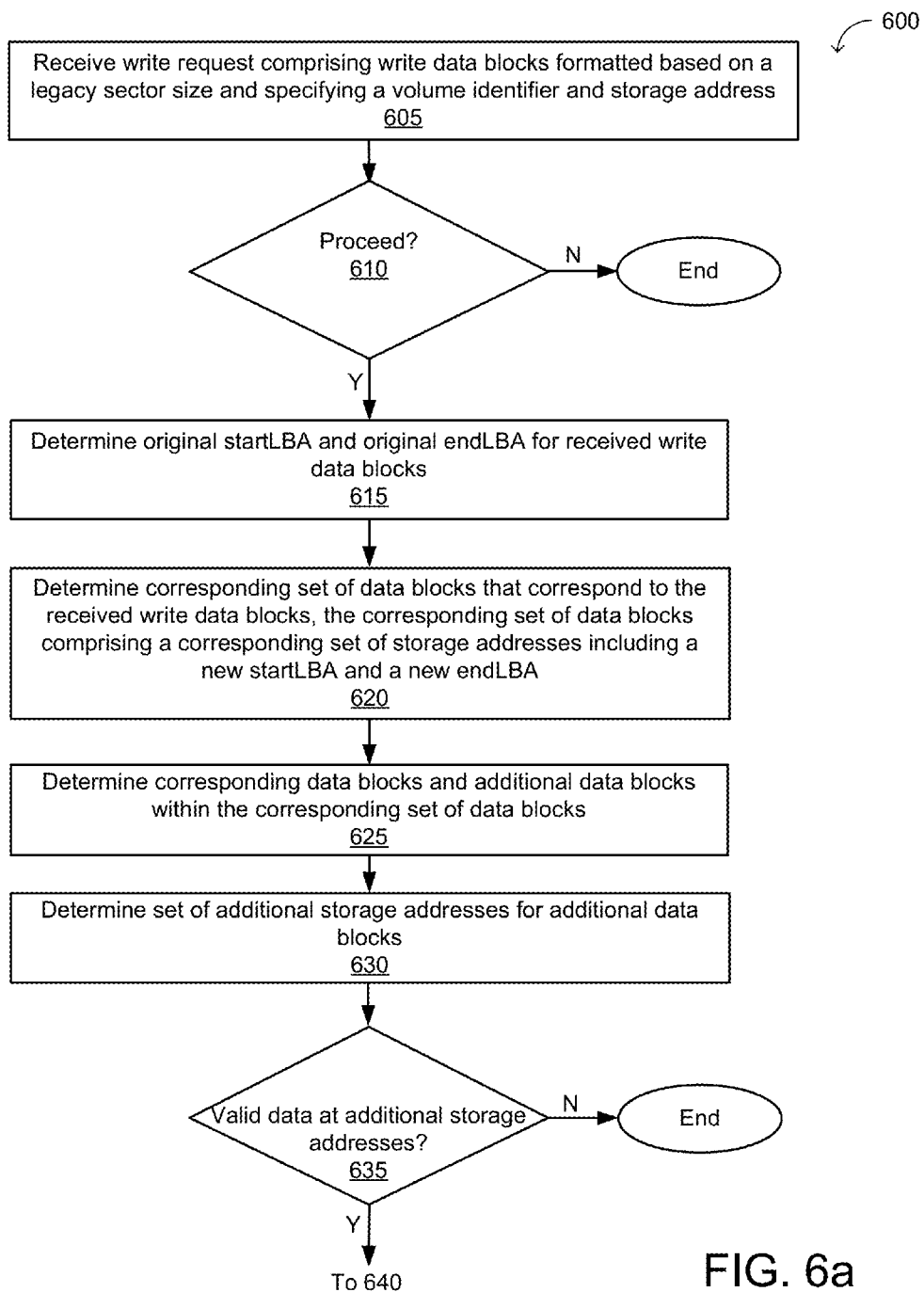
FIGS. 6A-B are a flowchart of a first method for modifying write requests using cached data.
Figure 6B:
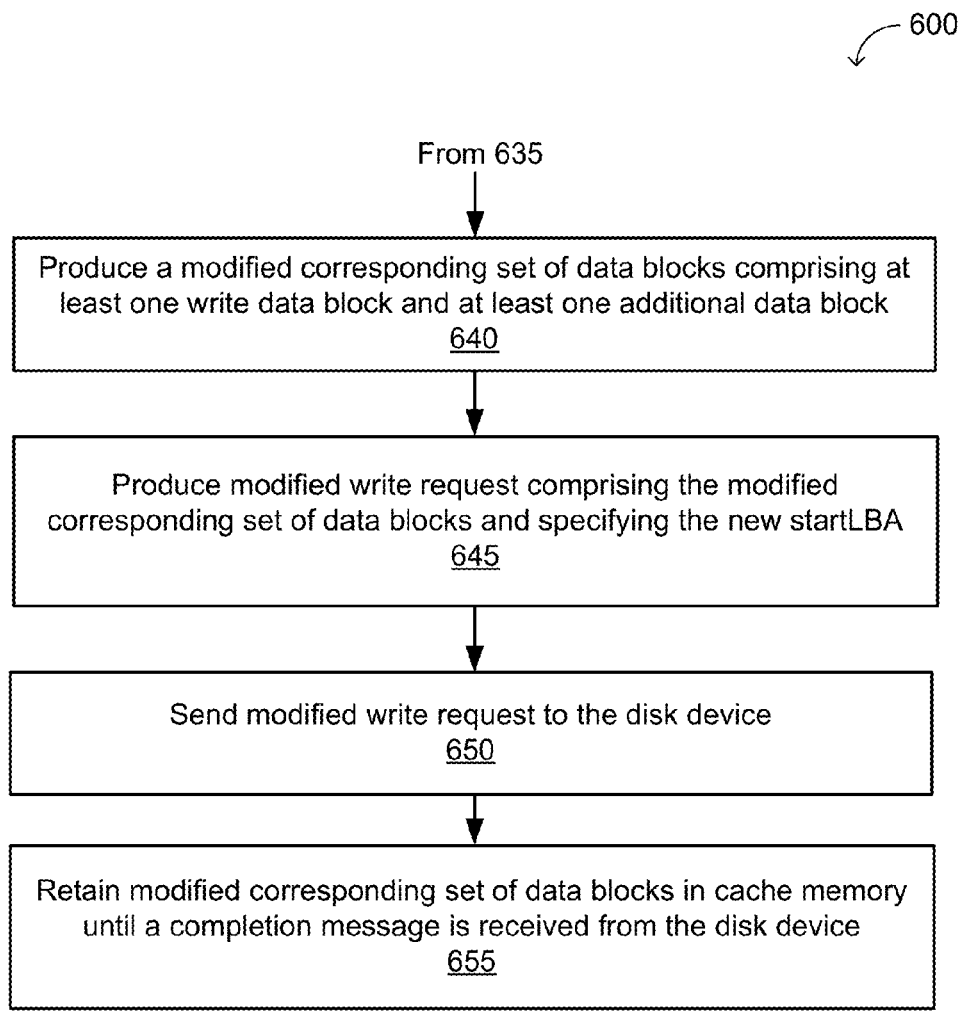

FIGS. 6A-B are a flowchart of a first method 600 for modifying write requests using cached data. Steps of method 600 may be performed by various computer hardware and/or software components residing and executing on a storage system 120 that are configured for performing the method 600. In some embodiments, some or all steps of method 600 are performed by the emulation mitigation module 275 in conjunction with other layers of the storage operating system 200. The order and number of steps of the method 600 are for illustrative purposes only and, in other embodiments, a different order and/or number of steps are used.

It is assumed that the caching layer 280 is independently and simultaneously executing caching algorithms that pre-fetch and cache data to the cache memory 225 based on patterns of received read requests. Conventionally, pre-fetching of data is based on the assumption of locality of reference for adjacent read requests. Caching algorithms are typically limited to reads patterns, since they conventionally have had no benefit for writes patterns. In some embodiments, the caching layer 280 may also independently and simultaneously execute write caching algorithms that pre-fetch and cache data to the cache memory 225 based on patterns of received write requests. In these embodiments, the write caching algorithms may comprise conventional caching algorithms that have been modified to include monitoring of write patterns and pre-fetching of data based on write patterns. The pre-fetching of data based on write patterns may increase the effectiveness and the likelihood that the first method will execute successfully. It is also assumed that the storage operating system 200 maintains a volume DS 250 for storing metadata information and attributes for a plurality of volumes stored on the storage system 120 (as described in relation to FIG. 3).

The method 600 begins when a write request is received (at 605), for example, from a legacy application 115 executing on a server system 110. The received write request comprises one or more legacy data blocks formatted based on a legacy sector size. The received write request also specifies or indicates a volume identifier and storage address that together identifies a location where the write data blocks are to be stored on a disk device. The volume identifier uniquely identifies a storage volume of the storage system. The received storage address (e.g., LBA) uniquely identifies a location in the storage volume where the write data blocks are to be stored on the disk device. The received storage address is formatted based on a legacy sector size. In particular, the write request may specify a start storage address of a start location of where to store the received write data blocks and a write data length/size of the received write data blocks.

The method 600 then determines (at 610) whether to proceed or terminate based on the received volume identifier. The method 600 may do so by examining the volume entry 301 for the identified volume in the volume DS 300 and determining whether the current sector size 312 is greater than the original sector size 310. If not, this indicates that the identified volume was originally formatted in a sector size and is currently stored to an advanced disk device formatted in the same sector size. In this case, the method 600 determines (at 610—No) to terminate as no further processing is necessary by the method 600 and the write request may be processed by conventional storage operation system methods. If, however, the current sector size 312 is greater than the original sector size 310, this indicates that the identified volume was originally formatted in a legacy sector size and is currently stored to an advanced disk device formatted in an advanced sector size. In this case, the method 600 determines (at 610—Yes) to proceed to step 615. Note that the current sector size 312 also indicates the sector size to expand out and align the received write data blocks (as described below).

The method 600 then determines (at 615) a start storage address (referred to herein as "original startLBA") and an end storage address (referred to herein as "original endLBA") for the received write data blocks. The received write request will specify the original startLBA and the original endLBA may be determined using the original startLBA and the write data length/size of the received write data blocks.

The method 600 then determines (at 620) a corresponding set of data blocks that correspond to the received write data blocks. The corresponding set of data blocks has a corresponding set of storage addresses, including a new start storage address (referred to herein as "new startLBA") and a new end storage address (referred to herein as "new endLBA"). The corresponding set of data blocks corresponds to one or more 4 k sectors that would contain/store the received write data blocks as stored on a 4 k disk device. Specifically, the corresponding set of data blocks span from and include all data blocks from the start data block (first data block) of a corresponding 4 k sector that would contain/store the first write data block (having the storage address "original startLBA") through the end data block (last data block) of a corresponding 4 k sector that would contain/store the last write data block (having the storage address "original endLBA").

In some embodiments, the corresponding set of data blocks (having a new startLBA and new endLBA) meets all the following requirements: 1) includes all LBAs of received write data blocks; 2) have a total data size equal to a 4 k sector or an integer multiple of a 4 k sector; 3) are aligned to 4 k sectors (since the new startLBA will begin at the start of a 4 k sector and the endLBAs will end at the end of a 4 k sector); and 4) comprises the smallest number of data blocks possible that still meets the above 3 requirements.

Figure 7:
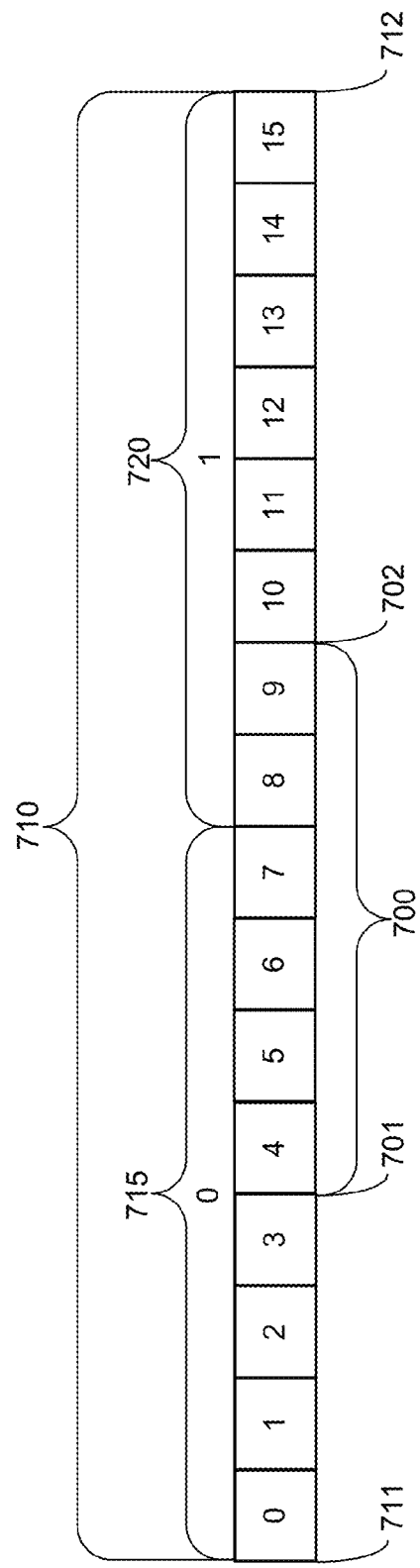
FIG. 7 shows a conceptual diagram of an exemplary corresponding set of data blocks for received write data blocks.

FIG. 7 shows a conceptual diagram of an exemplary corresponding set of data blocks for received write data blocks. In the example of FIG. 7, the received write blocks 700 comprise six 512-byte data blocks. The received write blocks 700 have an original startLBA 701 (e.g., LBA 4) and an original endLBA 702 (e.g., LBA 9). The corresponding set of data blocks 710 that correspond to the received write data blocks 700 has a new startLBA 711 (e.g., LBA 0) and a new endLBA 712 (e.g., LBA 15). The corresponding set of data blocks 710 corresponds to a first 4 k sector 715 and a second 4 k sector 720 that would contain/store the received write data blocks as stored on a 4 k disk device. Note that the corresponding set of data blocks 710 is aligned with and have the same total data size as the first and second 4 k sectors 715 and 720.

The method 600 may determine (at 620) the new startLBA of the corresponding set of data blocks using various methods known in the art. For example, the method 600 may perform the following operations: 1) divide original startLBA by 8=X (wherein 8 equals the multiplication factor between the legacy sector size and the advanced sector size); 2) round down X to next integer=Y; 3) multiply Y by 8=new startLBA. Thus the new startLBA is the LBA for the start data block (first data block) of the corresponding 4 k sector that would contain/store the first write data block having the storage address "original startLBA."

The method 600 may determine (at 620) the new endLBA of the corresponding set of data blocks using various methods known in the art. For example, the method 600 may perform the following operations: 1) increment original endLBA by 8=X (wherein 8 equals the multiplication factor between the legacy sector size and the advanced sector size); 2) divide X by 8=Y; 3) round down Y to next integer=Z; 4) (Z* 8)−1=new endLBA. Thus the new endLBA is the LBA for the end data block (last data block) of the corresponding 4 k sector that would contain/store the last write data block having the storage address "original endLBA."

In some embodiments, a corresponding set of data blocks comprises a set of one or more "corresponding data blocks" and a set of one or more "additional data blocks." Within the corresponding set of data blocks, the method 600 then determines (at 625) one or more "corresponding data blocks" and one or more "additional data blocks." A corresponding data block may comprise a data block that corresponds to a write data block in that they have they have the same storage address (e.g., same LBA). As such, the corresponding data block for a write data block will have the same offset position within the corresponding 4 k sector. A corresponding data block has a "corresponding storage address" that is equal to a storage address of a write data block. An additional data block may comprise a data block that does not corresponds to any received write data block and does not have the same storage address as any received write data block. As such, an additional data block will not have the same offset position as any received write data block within the corresponding 4 k sector. An additional data block has an "additional storage address" that is not equal to a storage address of any write data block.

Figure 8:
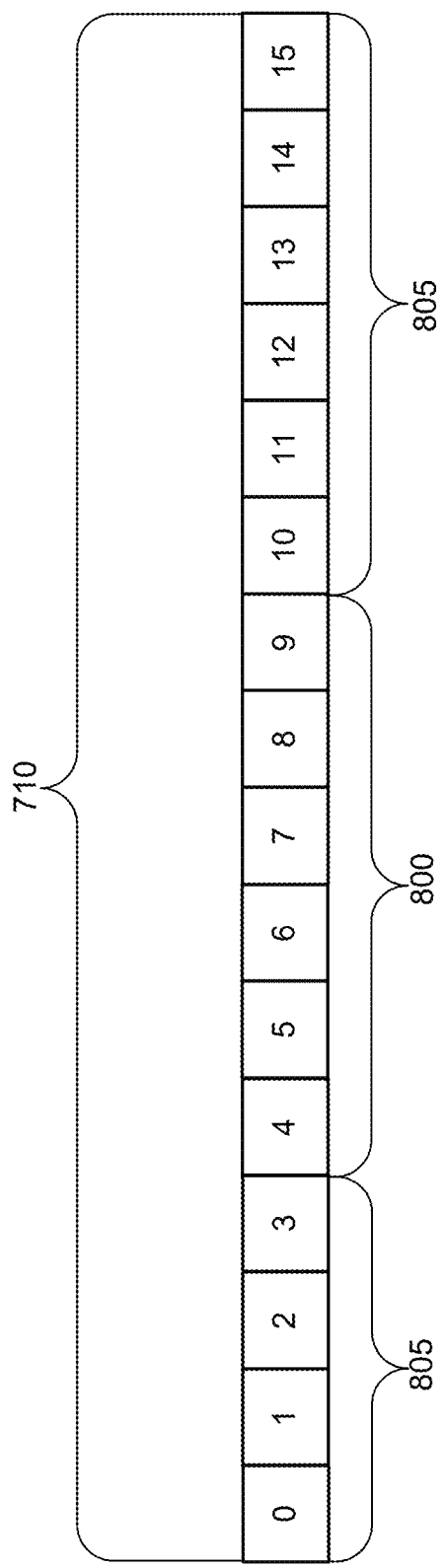
FIG. 8 shows a conceptual diagram of the exemplary corresponding set of data blocks comprising corresponding data blocks and additional data blocks.

FIG. 8 shows a conceptual diagram of the exemplary corresponding set of data blocks 710 (from FIG. 7) comprising corresponding data blocks 800 and additional data blocks 805. In the example of FIG. 8, corresponding data blocks 800 correspond to received write blocks 700 and have the same storage addresses (e.g., LBA 4-9). The additional data blocks 805 do not correspond to received write blocks 700 and do not have the same storage addresses. In the example of FIG. 8, the additional data blocks 805 have storage addresses LBA 0-3 and 10-15.

The method 600 then determines (at 630) a set of additional storage addresses comprising a storage address for each additional data block. The method 600 may do so, for example, by simply collecting a storage address for each additional data block determined in step 625. Alternatively, the method 600 may remove storage addresses of received write data blocks from the corresponding set of addresses to produce the set of additional storage addresses. As described above, the corresponding set of data blocks has a corresponding set of storage addresses that comprises a storage address for each data block in the corresponding set of data blocks. By removing the storage addresses of received write data blocks, the storage addresses of the corresponding data blocks are removed, leaving only the set of additional storage addresses.

The method 600 then determines (at 635) whether the set of additional data blocks comprises one or more additional data blocks and the cache memory 225 stores valid data at each and all additional storage addresses in the set of additional storage addresses. The method 600 may do so by examining the cache DS 255 to determine, for each additional storage address, whether the cache memory 225 stores a data block having a matching storage address that shows a valid data indicator in the cache DS 255. If method 600 determines (at 635—No) that the cache memory 225 does not store valid data at each and all additional storage addresses, the method 600 terminates as no further processing is necessary by the method 600 and the write request may be processed by conventional storage operation system methods. The method 600 terminates since the cache memory 225 does not have sufficient data to expand and align the received write data blocks to a 4 k sector.

If, however, the method 600 determines (at 635—Yes) that the cache memory 225 does store valid data at each and all additional storage addresses, the method 600 proceeds to step 640. In cache memory 225, the method 600 then produces (at 640) a modified corresponding set of data blocks comprising at least one write data block and at least one additional data block. In cache memory 225, the method 600 may do so by replacing/overwriting, within the corresponding set of data blocks, each corresponding data block with the write data block having the same storage address (e.g., delete each corresponding data block and store each received write data block).

Figure 9:
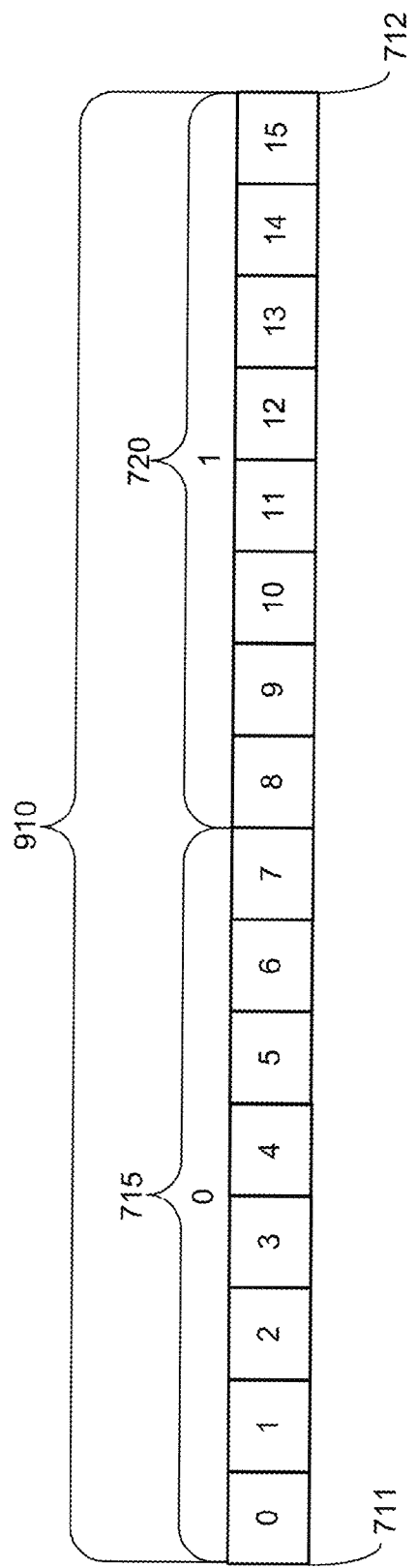
FIG. 9 shows a conceptual diagram of an exemplary modified corresponding set of data blocks.

The method 600 then produces (at 645) a modified write request comprising the modified corresponding set of data blocks. The modified write request will also specify or indicate the new startLBA, new endLBA, and/or data length of the modified corresponding set of data blocks. FIG. 9 shows a conceptual diagram of an exemplary modified corresponding set of data blocks 910 from the corresponding set of data blocks 710 of FIG. 7. In the example of FIG. 9, the modified corresponding set of data blocks 910 has a new startLBA 711 (e.g., LBA 0) and a new endLBA 712 (e.g., LBA 15).

Note that the modified corresponding set of data blocks 910 has the same properties as the corresponding set of data blocks 710 of FIG. 7. For example, the modified corresponding set of data blocks (having a new startLBA and endLBAs) also meets all the following requirements: 1) includes all LBAs of received write data blocks; 2) have a total data size equal to a 4 k sector or an integer multiple of a 4 k sector; 3) are aligned to 4 k sectors (since the new startLBA will begin at the start of a 4 k sector and the endLBAs will end at the end of a 4 k sector); and 4) comprises the smallest number of data blocks possible that still meets the above 3 requirements.

The method 600 then sends (at 650) the modified write request to the disk device for completion. Note that if the storage system is implementing a two-stage-write system, this step may be performed during the second stage after the delay period. In some embodiments, the method 600 does not send (at 650) the original received write request to the disk device. Since the modified corresponding set of data blocks will be equal in data size to one or more 4 k sectors and will also be aligned with the 4 k sectors, the writing of the modified corresponding set of data blocks to their one or more corresponding 4 k sectors will be straightforward and require minimal processing by the advanced disk device.

The method 600 then retains (at 655) the modified corresponding set of data blocks in cache memory 225 until a message is received from the disk device, the message indicating that the modified write request is successfully completed on the disk device. This ensures data integrity as the modified corresponding set of data blocks are not overwritten or modified in cache memory 225 until the disk device reports a completion of the modified write request. The method 600 then ends.

IV. Mitigating Write Emulation by Enforcing a Minimum Read Size

The second method comprises enforcing a minimum requested data size for any read request sent to the disk device, the minimum requested data size comprising the advanced sector size. The requested data may also be aligned to the advanced sector size. In some embodiments, the first method may be used in conjunction with the second method, wherein the first and second methods may be performed separately/independently and in parallel (simultaneously). In additional embodiments, the first method may be used in conjunction with the second and third methods, wherein the first, second, and third methods may be performed separately/independently and in parallel.

In some embodiments, the second method may be used along with the first method to increase the effectiveness of the first method. In these embodiments, the received read request comprises a legacy request for the data of one or more data blocks formatted based on a legacy sector size that are stored on an advanced disk device formatted based on an advanced sector size. The second method expands and aligns the legacy read requests to an advanced sector size before and sends the modified read request to the advanced disk device. As known in the art, any data read from disk are typically stored to cache memory 225. As such, the second method causes sets of read data blocks having the advanced sector size and being aligned to the advanced sector size to be stored to cache memory in response to legacy read requests. This, in turn, increases the likelihood that the first method will execute successfully (e.g., increases the likelihood that the first method 600 determines, at step 635, that the cache memory 225 stores valid data at each and all additional storage addresses).

Figure 10:
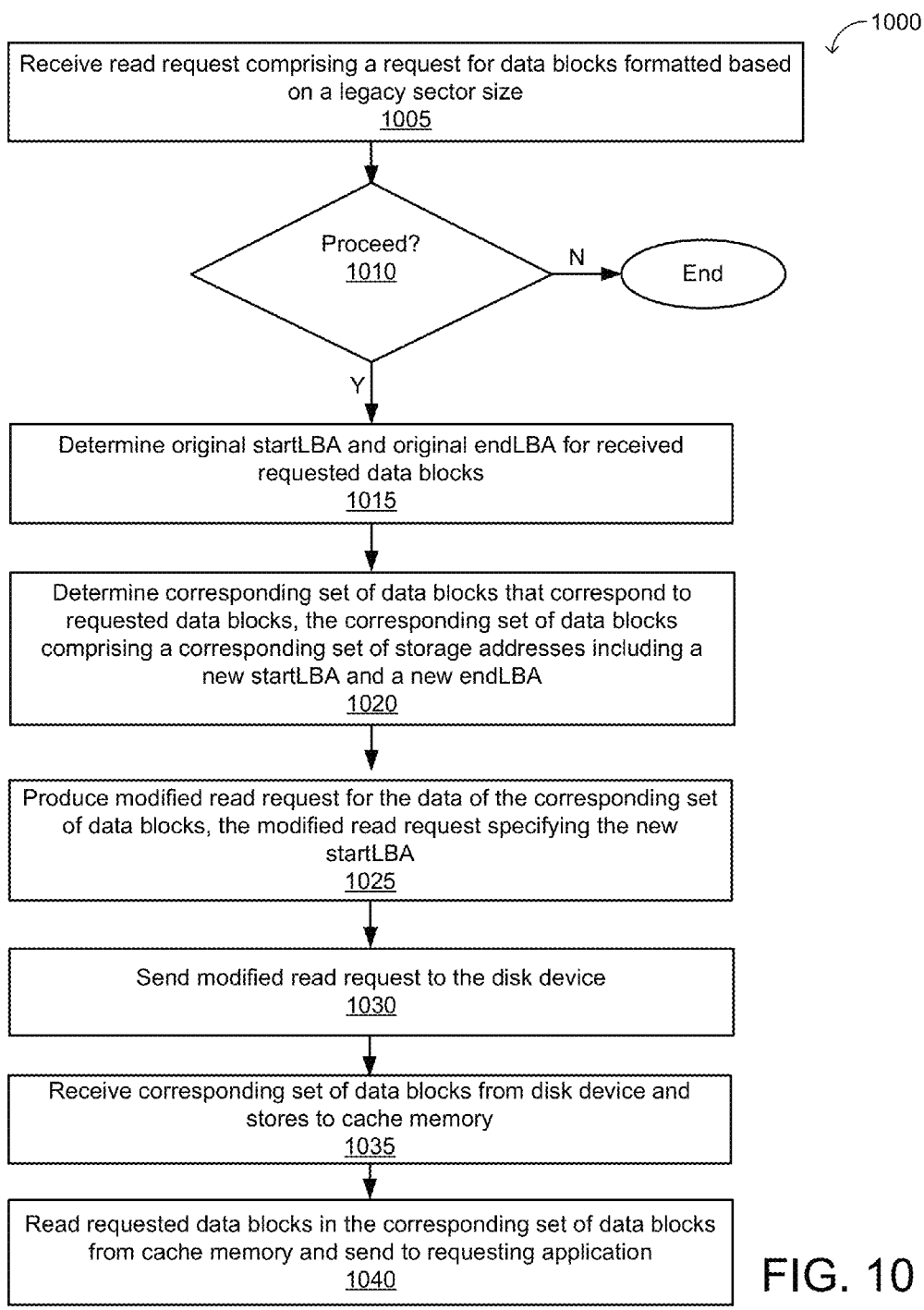
FIG. 10 is a flowchart of a second method for enforcing a minimum requested data size for any read request to the disk device.

FIG. 10 is a flowchart of a second method 1000 for enforcing a minimum requested data size for any read request to the disk device. Steps of method 1000 may be performed by various computer hardware and/or software components residing and executing on a storage system 120 that are configured for performing the method 1000. In some embodiments, some or all steps of method 1000 are performed by the emulation mitigation module 275 in conjunction with other layers of the storage operating system 200. The order and number of steps of the method 1000 are for illustrative purposes only and, in other embodiments, a different order and/or number of steps are used. It is assumed that the storage operating system 200 maintains a volume DS 250 for storing metadata information and attributes for a plurality of volumes stored on the storage system 120 (as described in relation to FIG. 3).

The method 1000 begins when a read request is received (at 1005) that is a cache miss. The read request may be received, for example, from a legacy application 115 executing on a server system 110. As known in the art, when a read request specifies data that is cached in cache memory 225, the requested data will be fetched directly from cache memory 225 and not read from disk. As such, it is assumed, at step 1005, that the cache memory 225 does not store the requested data and a read to disk is needed (i.e., a cache miss). As known in the art, data read from disk during a cache miss is typically stored to cache memory 225.

In some embodiments, the received read request comprises a request for the data of one or more data blocks ("requested data blocks") formatted based on a legacy sector size that are stored on a disk device formatted based on an advanced sector size. The received read request specifies or indicates a volume identifier and storage address that together identifies a location where data blocks are to be read from a disk device. The volume identifier uniquely identifies a storage volume of the storage system. The received storage address (e.g., LBA) uniquely identifies a location in the storage volume where the data blocks are to be read from the disk device. The received storage address is formatted based on a legacy sector size. In particular, the read request may specify a start storage address of a start location of where to read the data blocks and a read data length/size.

The method 1000 then determines (at 1010) whether to proceed or terminate based on the received volume identifier. The method 1000 may do so by examining the volume entry 301 for the identified volume in the volume DS 300 and determining whether the current sector size 312 is greater than the original sector size 310. If not, this indicates that the identified volume was originally formatted in a sector size and is currently stored to an advanced disk device formatted in the same sector size. In this case, the method 1000 determines (at 1010—No) to terminate as no further processing is necessary by the method 1000 and the read request may be processed by conventional storage operation system methods. If, however, the current sector size 312 is greater than the original sector size 310, this indicates that the identified volume was originally formatted in a legacy sector size and is currently stored to an advanced disk device formatted in an advanced sector size. In this case, the method 1000 determines (at 1010—Yes) to proceed to step 1015. Note that the current sector size 312 also indicates the sector size to expand out and align the read request (as described below).

The method 1000 then determines (at 1015) a start storage address (referred to herein as "original startLBA") and an end storage address (referred to herein as "original endLBA") for the requested data blocks. The received read request will specify the original startLBA and the original endLBA may be determined using the original startLBA and the read data length/size of the requested data blocks.

The method 1000 then determines (at 1020) a corresponding set of data blocks that correspond to the requested data blocks. The corresponding set of data blocks has a corresponding set of storage addresses, including a new start storage address (referred to herein as "new startLBA") and a new end storage address (referred to herein as "new endLBA"). The corresponding set of data blocks corresponds to one or more 4 k sectors that would contain/store the requested data blocks as stored on a 4 k disk device. Specifically, the corresponding set of data blocks span from and include all data blocks from the start data block (first data block) of a corresponding 4 k sector that would contain/store the first data block (having the storage address "original startLBA") through the end data block (last data block) of a corresponding 4 k sector that would contain/store the last data block (having the storage address "original endLBA").

In some embodiments, the corresponding set of data blocks (having a new startLBA and new endLBA) meets all the following requirements: 1) includes all LBAs of requested data blocks; 2) have a total data size equal to a 4 k sector or an integer multiple of a 4 k sector; 3) are aligned to 4 k sectors (since the new startLBA will begin at the start of a 4 k sector and the endLBAs will end at the end of a 4 k sector); and 4) comprises the smallest number of data blocks possible that still meets the above 3 requirements.

Figure 11:
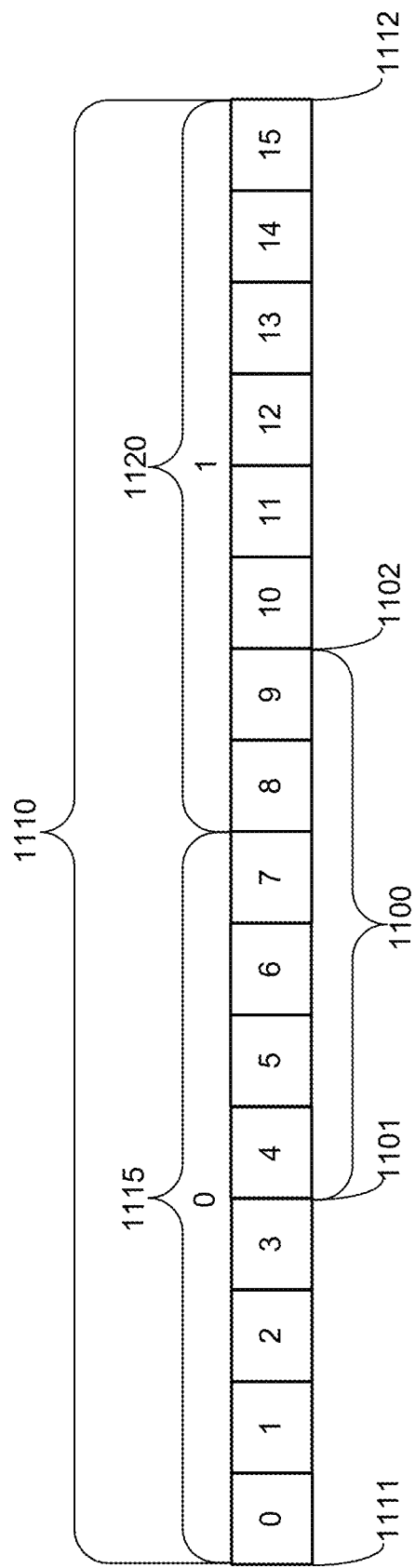
FIG. 11 shows a conceptual diagram of an exemplary corresponding set of data blocks for requested data blocks.

FIG. 11 shows a conceptual diagram of an exemplary corresponding set of data blocks for requested data blocks. In the example of FIG. 11, the requested data blocks 1100 comprise six 512-byte data blocks. The requested data blocks 1100 have an original startLBA 1101 (e.g., LBA 4) and an original endLBA 1102 (e.g., LBA 9). The corresponding set of data blocks 1110 that correspond to the requested data blocks 1100 has a new startLBA 1111 (e.g., LBA 0) and a new endLBA 1112 (e.g., LBA 15). The corresponding set of data blocks 1110 corresponds to a first 4 k sector 1115 and a second 4 k sector 1120 that would contain/store the requested data blocks as stored on a 4 k disk device. Note that the corresponding set of data blocks 1110 is aligned with and have the same total data size as the first and second 4 k sectors 1115 and 1120.

The method 1000 may determine (at 1020) the new startLBA of the corresponding set of data blocks using various methods known in the art. For example, the method 1000 may perform the following operations: 1) divide original startLBA by 8=X (wherein 8 equals the multiplication factor between the legacy sector size and the advanced sector size); 2) round down X to next integer=Y; 3) multiply Y by 8=new startLBA. Thus the new startLBA is the LBA for the start data block (first data block) of the corresponding 4 k sector that would contain/store the first data block having the storage address "original startLBA."

The method 1000 may determine (at 1020) the new endLBA of the corresponding set of data blocks using various methods known in the art. For example, the method 1000 may perform the following operations: 1) increment original endLBA by 8=X (wherein 8 equals the multiplication factor between the legacy sector size and the advanced sector size); 2) divide X by 8=Y; 3) round down Y to next integer=Z; 4) (Z*8)−1=new endLBA. Thus the new endLBA is the LBA for the end data block (last data block) of the corresponding 4 k sector that would contain/store the last data block having the storage address "original endLBA."

The method 1000 then produces (at 1025) a modified read request comprises a request for the data of the corresponding set of data blocks. The modified read request may specify or indicate the new startLBA, new endLBA, and/or data length of the corresponding set of data blocks. The method 1000 then sends (at 1030) the modified read request to the disk device for completion. In some embodiments, the method 1000 does not send the original received read request to the disk device. Since the corresponding set of data blocks will be equal in data size to one or more 4 k sectors and will also be aligned with the 4 k sectors, the reading of the corresponding set of data blocks will be straightforward and require minimal processing by the advanced disk device.

The method 1000 then receives (at 1035) the corresponding set of data blocks from the disk device and stores to cache memory 225. Since the corresponding set of data blocks stored in cache memory 225 will now be equal in data size to one or more 4 k sectors and will also be aligned with the 4 k sectors, this increases the effectiveness and the likelihood that the first method will execute successfully.

The method 1000 then reads (at 1040) the original requested data blocks (as originally requested from the legacy application) in the corresponding set of data blocks from cache memory 225 and sends the requested data blocks to the legacy application. The method 1000 then ends.

V. Mitigating Write Emulation by Conditionally Retrieving Data from Disk and Storing to Cache In general, the third method for conditionally retrieving data from the disk device and storing to cache comprises processing cached write data blocks before they are sent/flushed to disk. In some embodiments, the first method may be used in conjunction with the third method, wherein the first and third methods may be performed separately/independently and in parallel (simultaneously). In additional embodiments, the first method may be used in conjunction with the second and third methods, wherein the first, second, and third methods may be performed separately/independently and in parallel.

The third method may be used for storage systems implementing a two stage write, wherein during a first stage received write data blocks are stored to the cache memory 225, and during a second stage the write data blocks accumulated in the cache memory 225 are "flushed" to disk (sent and written to disk). As such, for a set of received write requests, the received write data blocks are stored to cache memory in the first stage (and the caching layer 280 stores the LBA and sets valid and flush indicators as true for each received write data block in the cache DS 255). During the delay period before the second stage begins, the third method may process the cached write data blocks, as described in embodiments herein. During the second stage, the first method may be performed to produce modified write requests that send/flush cached write data blocks to the disk devices.

As such, the third method may process cached write data blocks during a delay period between the first and second stages. The third method may expand and align some sets of write data blocks to a 4 k sector. The third method may do so by continually monitoring the cache memory 225 for continuous sets of data blocks containing valid data needing to be flushed to disk (e.g., using the cache DS 255). If a continuous set of data blocks has a total data size that is not aligned to a 4 k sector, the third method may retrieve additional data blocks from the disk device and store them to cache memory 225. The additional data blocks may comprise data blocks adjacent to the continuous set of data blocks used to expand and align the continuous set of data blocks to a 4 k sector.

Note that the first method will execute during the second stage to produce modified write requests that send/flush cached write data blocks to disk. As such, although the first and third methods generally execute separately and in parallel, some or all steps of the third method may execute before some or all steps of the first method execute. In these embodiments, before the first method determines that the cache memory 225 stores the corresponding set of data blocks, the third method comprises determining that the at least one additional data block is not stored to the cache device, and retrieving the at least one additional data block from the disk device, and storing the at least one additional data block to the cache device. As such, the third method may be used along with the first method to increase the effectiveness of the first method and the likelihood that the first method will execute successfully. In some cases, the third method may ensure that the first method will execute successfully.

Figure 12A:
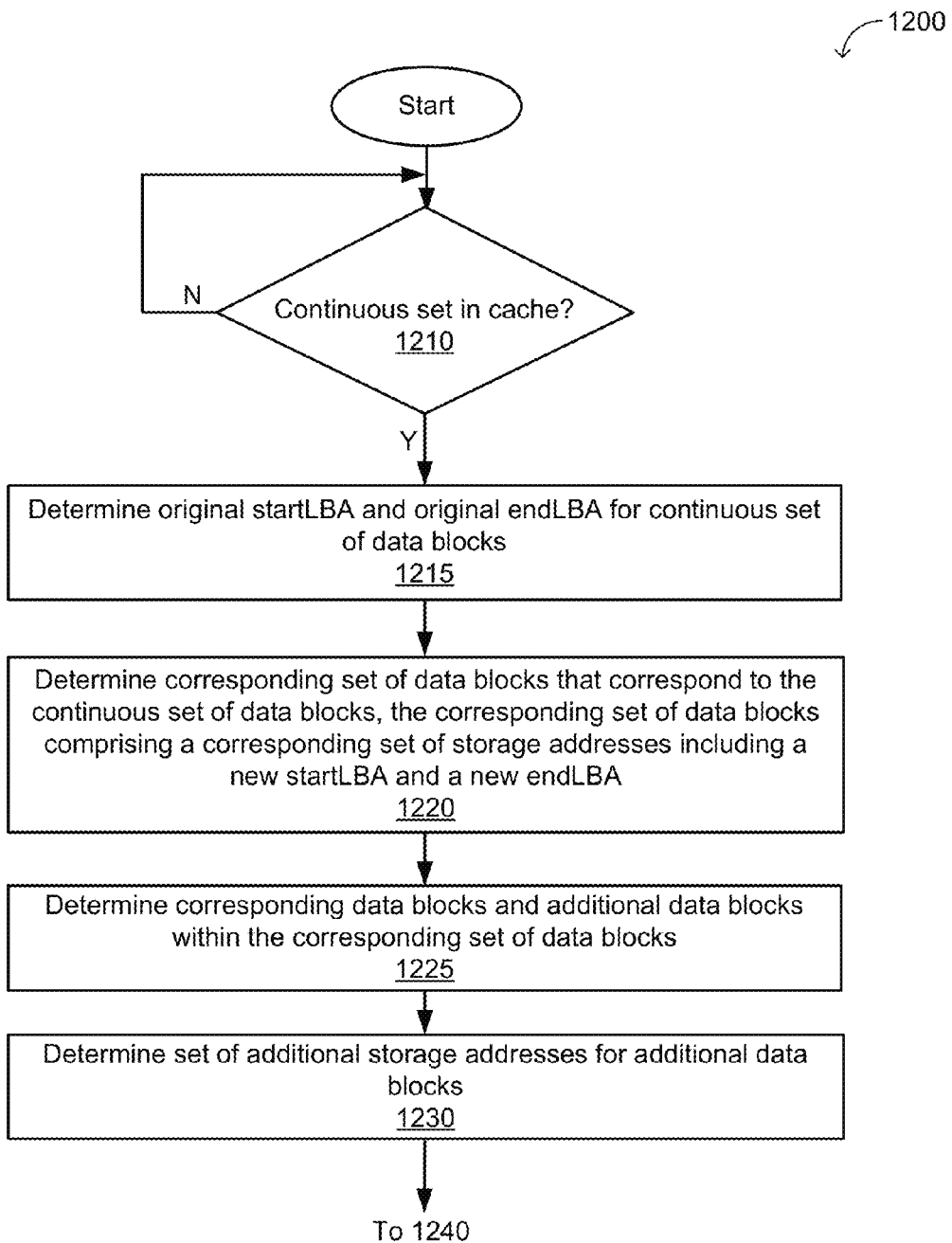
FIGS. 12A-B are a flowchart of a third method for conditionally retrieving data from the disk device and storing to cache.
Figure 12B:
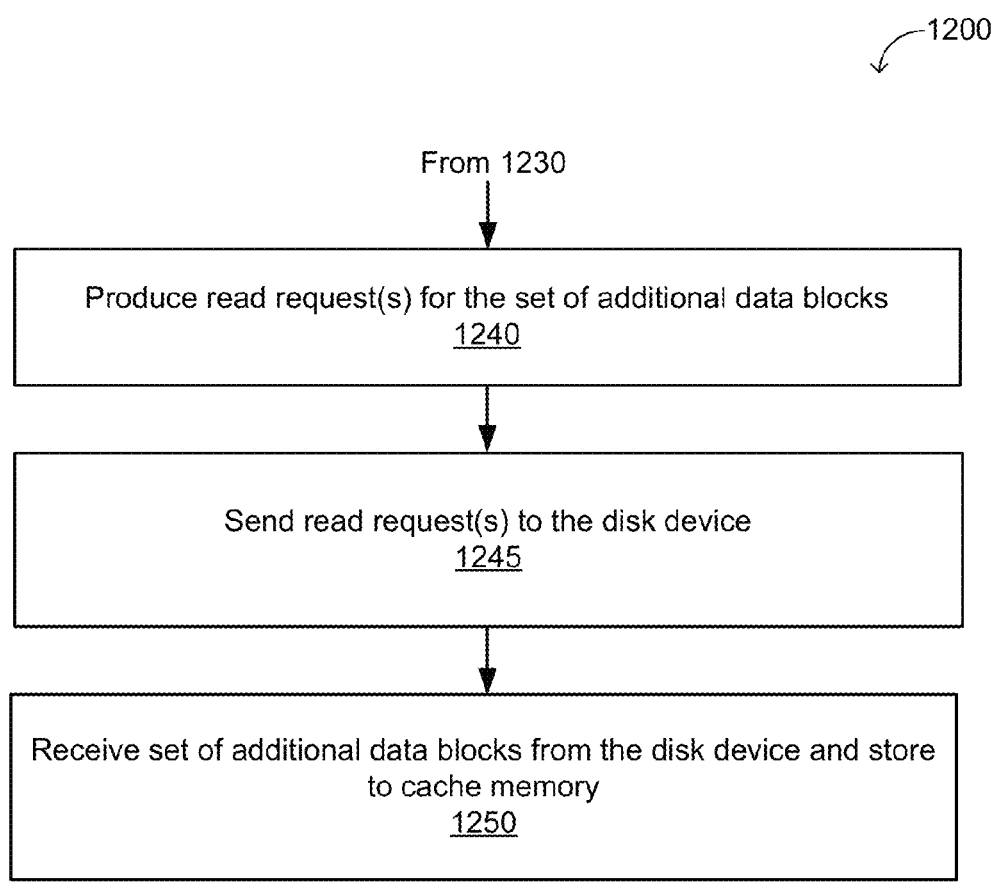

FIGS. 12A-B are a flowchart of a third method 1200 for conditionally retrieving data from the disk device and storing to cache. Steps of method 1200 may be performed by various computer hardware and/or software components residing and executing on a storage system 120 that are configured for performing the method 1200. In some embodiments, some or all steps of method 1200 are performed by the emulation mitigation module 275 in conjunction with other layers of the storage operating system 200. The order and number of steps of the method 1200 are for illustrative purposes only and, in other embodiments, a different order and/or number of steps are used. It is assumed that the storage operating system 200 is independently and simultaneously executing the two-stage-write layer 260 for performing received write requests in two stages. It is also assumed that the storage operating system 200 maintains a volume DS 250 for storing metadata information and attributes for a plurality of volumes stored on the storage system 120 (as described in relation to FIG. 3).

The method 1200 begins by determining (at 1210) whether the cache memory 225 stores a continuous set of one or more legacy data blocks (referred to herein as a "continuous set of data blocks") comprising write data blocks needing to be sent/flushed to a disk device. In some embodiments, a "continuous set of data blocks" meets the following requirements: 1) each data block comprises valid data; 2) each data block comprises write data to be flushed to a disk device; 3) if there is more than one data block in the set—the set of data blocks have continuous (sequential) storage addresses (e.g., sequential LBAs); 4) the set of data blocks comprises legacy data blocks that are to be stored to an advanced disk device; and 5) the set of data blocks are not aligned to a 4 k sector. For example, the method 1200 may do so by examining the cache DS 255 to determine continuous sets of data blocks using the volume ID, LBA, valid indicator, and flush indicator recorded for each data block in cache memory. Also, the method 1200 may use the volume identifier of each data block and the volume DS 300 to determine whether the current sector size 312 is greater than the original sector size 310 (indicating that the data block comprises a legacy data block to be stored to an advanced disk device).

If the method 1200 determines (at 1210—No) that the cache memory 225 does not store a qualifying continuous set of data blocks, the method 1200 continues at step 1210 where it continues to search for a qualifying continuous set of data blocks. If the method 1200 determines (at 1210—Yes) that the cache memory 225 stores a qualifying continuous set of data blocks, the method 1200 continues at step 1215.

The method 1200 then determines (at 1215) the storage addresses of the continuous set of data blocks, including a start storage address (referred to herein as "original startLBA") and an end storage address (referred to herein as "original endLBA") for the continuous set of data blocks. For example, the method 1200 may do so using the cache DS 255 to determine storage addresses (e.g., LBAs) for the continuous set of data blocks.

The method 1200 then determines (at 1220) a corresponding set of data blocks that correspond to the continuous set of data blocks. The corresponding set of data blocks has a corresponding set of storage addresses, including a new start storage address (referred to herein as "new startLBA") and a new end storage address (referred to herein as "new endLBA"). The corresponding set of data blocks corresponds to one or more 4 k sectors that would contain/store the continuous set of data blocks as stored on a 4 k disk device. Specifically, the corresponding set of data blocks span from and include all data blocks from the start data block (first data block) of a corresponding 4 k sector that would contain/store the first data block in the continuous set (having the storage address "original startLBA") through the end data block (last data block) of a corresponding 4 k sector that would contain/store the last data block in the continuous set (having the storage address "original endLBA").

In some embodiments, the corresponding set of data blocks (having a new startLBA and endLBAs) meets all the following requirements: 1) includes all LBAs of continuous set of data blocks; 2) have a total data size equal to a 4 k sector or an integer multiple of a 4 k sector; 3) are aligned to 4 k sectors (since the new startLBA will begin at the start of a 4 k sector and the endLBAs will end at the end of a 4 k sector); and 4) comprises the smallest number of data blocks possible that still meets the above 3 requirements.

Figure 13:
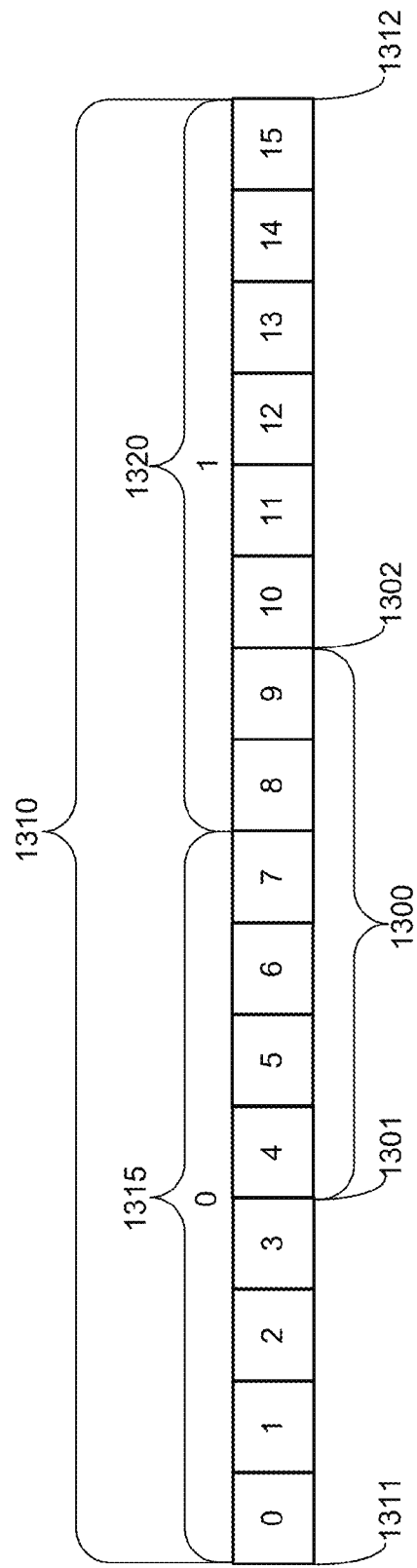
FIG. 13 shows a conceptual diagram of an exemplary corresponding set of data blocks for a continuous set of data blocks.

FIG. 13 shows a conceptual diagram of an exemplary corresponding set of data blocks for a continuous set of data blocks. In the example of FIG. 13, the continuous set of data blocks 1300 comprises six 512-byte data blocks. The continuous set of data blocks 1300 have an original startLBA 1301 (e.g., LBA 4) and an original endLBA 1302 (e.g., LBA 9). Note that the continuous set of data blocks 1300 meets the requirements for a continuous set of data blocks discussed above, such as 1) each data block comprises valid data; 2) each data block comprises write data to be flushed to a disk device; 3) the set of data blocks have continuous sequential LBAs; 4) the set of data blocks comprises legacy data blocks that are to be stored to an advanced disk device; and 5) the set of data blocks are not aligned to a 4 k sector (since the set of blocks 1300 do not start and end at 4 k sector boundaries, such as boundaries of a first 4 k sector 1315 and/or a second 4 k sector 1320). The corresponding set of data blocks 1310 that correspond to the continuous set of data blocks 1300 has a new startLBA 1311 (e.g., LBA 0) and a new endLBA 1312 (e.g., LBA 15). The corresponding set of data blocks 1310 corresponds to a first 4 k sector 1315 and a second 4 k sector 1320 that would contain/store the continuous set of data blocks as stored on a 4 k disk device. Note that the corresponding set of data blocks 1310 is aligned with and have the same total data size as the first and second 4 k sectors 1315 and 1320.

The method 1200 may determine (at 1220) the new startLBA of the corresponding set of data blocks using various methods known in the art. For example, the method 1200 may perform the following operations: 1) divide original startLBA by 8=X (wherein 8 equals the multiplication factor between the legacy sector size and the advanced sector size); 2) round down X to next integer=Y; 3) multiply Y by 8=new startLBA. Thus the new startLBA is the LBA for the start data block (first data block) of the corresponding 4 k sector that would contain/store the first data block in the continuous set having the storage address "original startLBA."

The method 1200 may determine (at 1220) the new endLBA of the corresponding set of data blocks using various methods known in the art. For example, the method 1200 may perform the following operations: 1) increment original endLBA by 8=X (wherein 8 equals the multiplication factor between the legacy sector size and the advanced sector size); 2) divide X by 8=Y; 3) round down Y to next integer=Z; 4) (Z*8)−1=new endLBA. Thus the new endLBA is the LBA for the end data block (last data block) of the corresponding 4 k sector that would contain/store the last data block in the continuous set having the storage address "original endLBA."

In some embodiments, a corresponding set of data blocks comprises a set of one or more "corresponding data blocks" and a set of one or more "additional data blocks." Within the corresponding set of data blocks, the method 1200 then determines (at 1225) one or more "corresponding data blocks" and one or more "additional data blocks." A corresponding data block may correspond to a particular data block in the continuous set in that they have they have the same storage address (e.g., same LBA). As such, the corresponding data block for a particular data block in the continuous set will have the same offset position within the corresponding 4 k sector. A corresponding data block has a "corresponding storage address" that is equal to a storage address of the particular data block in the continuous set. An additional data block does not correspond to any data block in the continuous set and does not have the same storage address as any data block in the continuous set. As such, an additional data block will not have the same offset position as any data block in the continuous set within the corresponding 4 k sector. An additional data block has an "additional storage address" that is not equal to a storage address of any data block in the continuous set.

Figure 14:
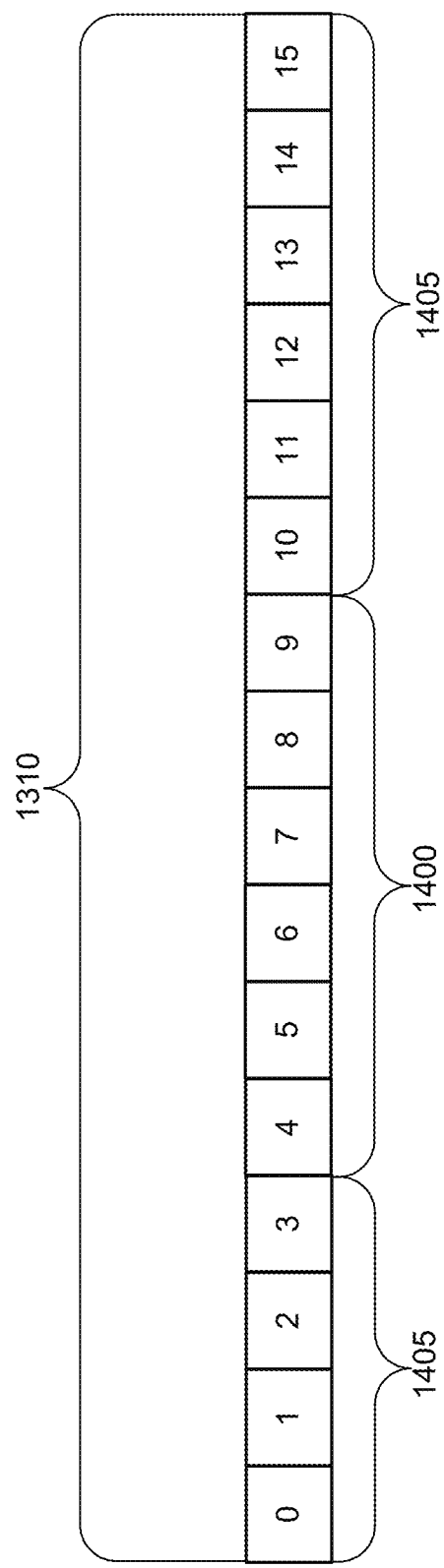
FIG. 14 shows a conceptual diagram of the exemplary corresponding set of data blocks comprising corresponding data blocks and additional data blocks.

FIG. 14 shows a conceptual diagram of the exemplary corresponding set of data blocks 1310 (from FIG. 13) comprising corresponding data blocks 1400 and additional data blocks 1405. In the example of FIG. 14, corresponding data blocks 1400 correspond to the continuous set of data blocks 1300 and have the same storage addresses (e.g., LBA 4-9). The additional data blocks 1405 do not correspond to the continuous set of data blocks 1300 and do not have the same storage addresses. In the example of FIG. 14, the additional data blocks 1405 have storage addresses LBA 0-3 and 10-15.

The method 1200 then determines (at 1230) a set of additional storage addresses comprising a storage address for each additional data block. The method 1200 may do so, for example, by simply collecting a storage address for each additional data block determined in step 1225. Alternatively, the method 1200 may remove storage addresses of the continuous set of data blocks from the corresponding set of addresses to produce the set of additional storage addresses. As described above, the corresponding set of data blocks has a corresponding set of storage addresses that comprises a storage address for each data block in the corresponding set of data blocks. By removing the storage addresses of the continuous set of data blocks, the storage addresses of the corresponding data blocks are removed, leaving only the set of additional storage addresses.

The method 1200 then produces (at 1240) one or more read requests comprising one or more requests for the data of the set of additional data blocks. The read request may specify or indicate the storage addresses for the set of additional data blocks. If the set of additional data blocks do not have sequential storage addresses (such as in the example of FIG. 14), the method 1200 may produce two or more read requests, one read request for each grouping of additional data blocks having sequential storage addresses in the set of additional data blocks.

The method 1200 then sends (at 1245) the one or more read requests to the disk device for completion. The method 1200 then receives (at 1250) data of the set of additional data blocks from the disk device and stores to cache memory 225. When storing the set of additional data blocks to cache memory 225, the method 1200 also modifies the cache DS to reflect the new additional data blocks in cache memory, such as storing the volume ID and LBA, and setting the valid indicator to indicate valid data for each additional data block in cache memory. The method 1200 then ends.

Since the set of additional data blocks 1405 (of the corresponding set of data blocks 1310 containing the continuous set of data blocks 1300) is now stored to cache memory 255, this will increase the effectiveness and the likelihood that the first method will execute successfully for the continuous set of data blocks 1300, since the required data (the set of additional data blocks 1405) is now stored to cache. In some cases (e.g., if there is enough time to process all continuous set of data blocks in cache memory), the third method may ensure that the first method will execute successfully in all cases.

Various Embodiments

Some embodiments may be conveniently implemented using a conventional general purpose or a specialized digital computer or microprocessor programmed according to the teachings herein, as will be apparent to those skilled in the computer art. Some embodiments may be implemented by a general purpose computer programmed to perform method or process steps described herein. Such programming may produce a new machine or special purpose computer for performing particular method or process steps and functions (described herein) pursuant to instructions from program software. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information may be represented using any of a variety of different technologies and techniques.

Some embodiments include a computer program product comprising a computer readable medium (media) having instructions stored thereon/in and, when executed (e.g., by a processor), perform methods, techniques, or embodiments described herein, the computer readable medium comprising instructions for performing various steps of the methods, techniques, or embodiments described herein. The computer readable medium may comprise a non-transitory computer readable medium. The computer readable medium may comprise a storage medium having instructions stored thereon/in which may be used to control, or cause, a computer to perform any of the processes of an embodiment. The storage medium may include, without limitation, any type of disk including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Those of skill would further appreciate that the various illustrative logical blocks, circuits, modules, algorithms, techniques, processes, or method steps of embodiments described herein may be implemented as computer electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The modules, algorithm, techniques, processes, or methods described in connection with embodiments disclosed herein may be embodied directly in computer hardware configured to perform the embodiments disclosed herein, in software executed by a processor, or in a combination of the two. In some embodiments, any software application, program, tool, module, or layer described herein may comprise an engine (such as a caching engine 280, deduplication engine 275, storage engine 380, etc.) comprising hardware, software, or a combination of the two configured to perform embodiments described herein. In general, functions of a software application, program, tool, module, or layer described herein may be embodied directly in hardware, or embodied as software executed by a processor, or embodied as a combination of the two.

A software application, layer, or module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

What is claimed is:

1. A system comprising:
    a memory containing machine readable medium comprising machine executable code having stored thereon instructions for performing a method of mitigating write emulation for a disk device using cache memory; and
    a processor coupled to the memory, wherein the processor is configured to execute the machine executable code to cause the processor to:
        receive a write request comprising write data to be written to the disk device, the write data including at least one write data block formatted in a first sector size, the disk device comprising a plurality of sectors formatted in a second sector size, the second sector size being larger than the first sector size, and each sector storing a plurality of data blocks comprising the first sector size;
        determine a corresponding sector on the disk device for the write data block to be written to the disk device;
        determine that a cache device stores a corresponding set of data blocks corresponding to all of the plurality of data blocks stored in the corresponding sector on the disk device to which the write data block is to be written;
        replace a corresponding data block in the corresponding set of data blocks on the cache device with the write data block to produce a modified corresponding set of data blocks on the cache device, the modified corresponding set of data blocks comprising the write data block and at least one additional data block; and
        send a modified write request to the disk device, the modified write request comprising the modified corresponding set of data blocks from the cache device to be written to the corresponding sector on the disk device.

2. The system of claim 1, wherein:
    the corresponding set of data blocks are aligned to boundaries of the at least one corresponding sector.

3. The system of claim 1, wherein:
    the corresponding data block in the corresponding set of data blocks on the cache device has a same storage address as the write data block to be stored to the corresponding sector on the disk device; and
    the additional data block does not have the same storage address as the write data block.

4. The system of claim 1, wherein:
    the second sector size used to format the plurality of sectors of the disk device is a native sector size of the disk device; and
    the second sector size is an integer multiple of the first sector size.

5. The system of claim 1, wherein the machine executable code further causes the processor to:
    retain the modified corresponding set of data blocks in the cache device until a message is received from the disk device, the message indicating that the modified write request is successfully completed on the disk device.

6. The system of claim 1, wherein the machine executable code further causes the processor to:
    execute a write caching algorithm for caching data to the cache device based on received write requests.

7. The system of claim 1, wherein the machine executable code further causes the processor to:

provide a minimum requested data size for any read request sent to the disk device, the minimum requested data size comprising the second sector size.

8. The system of claim 1, wherein the machine executable code further causes the processor to:
determine that the at least one additional data block is not stored to the cache device, before determining that the cache device stores the corresponding set of data blocks;
retrieve the at least one additional data block from the disk device; and
store the at least one additional data block to the cache device.

9. A non-transitory machine readable medium having stored thereon instructions for performing a method comprising machine executable code which when executed by at least one machine, causes the machine to:
receive, at a storage system comprising a cache device, a write request comprising write data for storing to a disk device, the write data formatted in a first sector size and comprising at least one write data block comprising the first sector size, the disk device comprising a plurality of sectors formatted in a second sector size, the second sector size being larger than the first sector size, each sector storing a plurality of data blocks comprising the first sector size;
determine at least one corresponding sector on the disk device, the at least one write data block to be stored to the at least one corresponding sector on the disk device;
determine that the cache device stores a corresponding set of data blocks corresponding to all of the plurality of data blocks stored in the at least one corresponding sector on the disk device, the corresponding set of data blocks comprising at least one corresponding data block and at least one additional data block, each corresponding data block corresponding to a write data block;
replace each corresponding data block with a corresponding write data block in the corresponding set of data blocks to produce a modified corresponding set of data blocks comprising at least one write data block and at least one additional data block; and
send a modified write request to the disk device, the modified write request comprising the modified corresponding set of data blocks.

10. The non-transitory computer readable medium of claim 9, wherein:
the corresponding set of data blocks are aligned to boundaries of the at least one corresponding sector.

11. The non-transitory computer readable medium of claim 9, wherein:
a first corresponding data block, corresponding to a first write data block, has a same storage address as the first write data block; and
an additional data block does not have a same storage address as a write data block.

12. The non-transitory computer readable medium of claim 9, wherein:
the plurality of sectors of the disk device comprises a native size comprising the second sector size, the plurality of sectors being written in the second sector size; and
the second sector size is an integer multiple of the first sector size.

13. The non-transitory computer readable medium of claim 9, wherein the instructions further cause the machine to:
retain the modified corresponding set of data blocks in the cache device until a message is received from the disk device, the message indicating that the modified write request is successfully completed on the disk device.

14. The non-transitory computer readable medium of claim 9, wherein the instructions further cause the machine to:
execute a write caching algorithm for caching data to the cache device based on received write requests.

15. The non-transitory computer readable medium of claim 9, wherein the instructions further cause the machine to:
provide a minimum requested data size for any read request sent to the disk device, the minimum requested data size comprising the second sector size.

16. The non-transitory computer readable medium of claim 9, wherein the instructions further cause the machine to:
determine that the at least one additional data block is not stored to the cache device, before determining that the cache device stores the corresponding set of data blocks;
retrieve the at least one additional data block from the disk device; and
store the at least one additional data block to the cache device.

17. A system comprising:
a memory containing machine readable medium comprising machine executable code having stored thereon instructions for performing a method of mitigating write emulation for a disk device using cache memory; and
a processor coupled to the memory, wherein the processor is configured to execute the machine executable code to cause the processor to:
receive a write request comprising write data for storing to a disk device, the write data formatted in a first sector size and comprising at least one write data block comprising the first sector size, each write data block comprising a storage address formatted in the first sector size, the disk device comprising a plurality of sectors formatted in a second sector size, the second sector size being larger than the first sector size, each sector storing a plurality of data blocks comprising the first sector size;
determine at least one corresponding sector on the disk device, the at least one write data block to be stored to the at least one corresponding sector on the disk device;
determine that a cache device stores a corresponding set of data blocks having a corresponding set of storage addresses, formatted in the first sector size, and corresponding to all of the plurality of data blocks stored in the at least one corresponding sector on the disk device, the corresponding set of storage addresses comprising at least one corresponding storage address and at least one additional storage address, each corresponding storage address being equal to a storage address of a write data block;
determine that the cache device stores at least one additional data block comprising an additional storage address; and
send a modified write request to the disk device, the modified write request comprising the at least one write data block and the at least one additional data block.

18. The system of claim 17, wherein:
the corresponding set of storage addresses are aligned to boundaries of the at least one corresponding sector.

19. The system of claim 17, wherein:
the plurality of sectors of the disk device comprises a native size comprising the second sector size, the plurality of sectors being written in the second sector size; and
the second sector size is an integer multiple of the first sector size.

20. A non-transitory computer readable medium having stored thereon instructions for performing a method comprising machine executable code which when executed by at least one machine, causes the machine to:
receive, at a storage system comprising a cache device, a write request comprising write data for storing to a disk device, the write data formatted in a first sector size and comprising at least one write data block comprising the first sector size, each write data block comprising a storage address formatted in the first sector size, the disk device comprising a plurality of sectors formatted in a second sector size, the second sector size being larger than the first sector size, each sector storing a plurality of data blocks comprising the first sector size;
determine at least one corresponding sector on the disk device, the at least one write data block to be stored to the at least one corresponding sector on the disk device;
determine that the cache device stores a corresponding set of data blocks having a corresponding set of storage addresses, formatted in the first sector size, and corresponding to all of the plurality of data blocks stored in the at least one corresponding sector, the corresponding set of storage addresses comprising at least one corresponding storage address and at least one additional storage address, each corresponding storage address being equal to a storage address of a write data block; and
determine that the cache device stores at least one additional data block comprising an additional storage address; and
send a modified write request to the disk device, the modified write request comprising the at least one write data block and the at least one additional data block.

21. The non-transitory computer readable medium of claim 20, wherein:
the corresponding set of storage addresses are aligned to boundaries of the at least one corresponding sector.

22. The non-transitory computer readable medium of claim 20, wherein:
the plurality of sectors of the disk device comprises a native size comprising the second sector size, the plurality of sectors being written in the second sector size; and
the second sector size is an integer multiple of the first sector size.

* * * * *